(12) United States Patent
Lindemann et al.

(10) Patent No.: US 11,067,403 B2
(45) Date of Patent: *Jul. 20, 2021

(54) VEHICLE ENERGY USAGE TRACKING

(71) Applicant: GM GLOBAL TECHNOLOGY OPERATIONS LLC, Detroit, MI (US)

(72) Inventors: Todd P. Lindemann, Howell, MI (US); Barak Hershkovitz, Herzliya (IL); Yuval Gilboa, Pardesiya (IL); Nadav Baron, Herzliya (IL); Dima Zevelev, Herzliya (IL); Richard B. Weinberg, Highland, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 238 days.

This patent is subject to a terminal disclaimer.

(21) Appl. No.: 16/028,094

(22) Filed: Jul. 5, 2018

(65) Prior Publication Data

US 2020/0011687 A1   Jan. 9, 2020

(51) Int. Cl.
*G01C 21/34* (2006.01)
*G07C 5/02* (2006.01)
*G07C 5/00* (2006.01)
*B60K 6/20* (2007.10)

(52) U.S. Cl.
CPC ......... *G01C 21/3469* (2013.01); *G07C 5/008* (2013.01); *G07C 5/02* (2013.01); *B60K 6/20* (2013.01); *B60Y 2200/92* (2013.01)

(58) Field of Classification Search
CPC ...... G01C 21/3469; G07C 5/02; G07C 5/008; G07C 5/0808; B60Y 2200/92; B60K 6/20
See application file for complete search history.

(56) References Cited

U.S. PATENT DOCUMENTS

| 5,487,002 | A | * | 1/1996 | Diller | G01C 21/3469 |
| | | | | | 701/1 |
| 5,668,310 | A | * | 9/1997 | Parkman | G01F 9/008 |
| | | | | | 123/525 |
| 5,913,917 | A | * | 6/1999 | Murphy | B60R 16/0232 |
| | | | | | 701/123 |
| 6,714,857 | B2 | * | 3/2004 | Kapolka | G08G 1/20 |
| | | | | | 340/902 |
| 6,934,615 | B2 | * | 8/2005 | Flann | A01B 69/008 |
| | | | | | 172/2 |

(Continued)

FOREIGN PATENT DOCUMENTS

| CN | 102435195 A | * | 5/2012 | ............. G06F 16/29 |
| CN | 104044593 A | * | 9/2014 | ............. B60K 31/00 |

(Continued)

*Primary Examiner* — Behrang Badii
*Assistant Examiner* — Jalal C Coduroglu
(74) *Attorney, Agent, or Firm* — Quinn IP Law

(57) ABSTRACT

A system and method of tracking energy usage in a vehicle. The method, in one implementation, involves building an energy usage prediction model, obtaining a planned route for a vehicle that contains one or more planned route segments, applying the energy usage prediction model to each planned route segment of the one or more planned route segments of the planned route to obtain an energy usage plan, receiving onboard data from the vehicle, constructing an actual route based on the onboard data, and performing a match analysis between the planned route and the actual route based on the onboard data.

20 Claims, 12 Drawing Sheets

(56) References Cited

U.S. PATENT DOCUMENTS

| | | | |
|---|---|---|---|
| 7,949,435 B2* | 5/2011 | Pollack | G06Q 50/06 700/291 |
| 8,284,039 B2* | 10/2012 | Baker | G07C 5/008 340/439 |
| 8,433,455 B2* | 4/2013 | Siy | B60L 58/12 701/1 |
| 8,543,272 B2* | 9/2013 | Yu | B60W 20/12 701/22 |
| 8,554,473 B2* | 10/2013 | Arcot | G06K 9/00818 701/423 |
| 8,589,076 B2* | 11/2013 | Hamilton, II | G01C 21/3469 701/532 |
| 8,706,416 B2* | 4/2014 | Wang | G01C 21/3469 701/533 |
| 8,732,487 B2* | 5/2014 | Goraczko | G06F 1/3206 713/300 |
| 8,831,806 B2* | 9/2014 | Kinser | B60L 58/12 701/22 |
| 8,855,907 B2* | 10/2014 | Eckhoff | B60K 6/48 701/123 |
| 8,898,278 B2* | 11/2014 | Bridges | B60L 53/305 709/224 |
| 8,942,919 B2* | 1/2015 | Uyeki | G01C 21/3469 701/423 |
| 8,948,940 B2* | 2/2015 | Schoonmaker | B61C 17/12 701/19 |
| 8,983,762 B2* | 3/2015 | Davidson | G06Q 10/06398 701/123 |
| 9,008,955 B2* | 4/2015 | Tate, Jr. | G01C 21/3469 701/123 |
| 9,043,106 B2* | 5/2015 | Ingram | B64D 27/24 701/70 |
| 9,079,507 B2* | 7/2015 | Smith | B60L 11/1877 |
| 9,081,651 B2* | 7/2015 | Filev | B60K 31/00 |
| 9,103,686 B2* | 8/2015 | Pettersson | B60L 1/14 |
| 9,121,722 B1* | 9/2015 | Yu | G01C 21/3469 |
| 9,283,954 B2* | 3/2016 | Dalum | B60L 58/12 |
| 9,291,468 B2* | 3/2016 | Tate, Jr. | G01C 21/3469 |
| 9,374,787 B2* | 6/2016 | de Lind van Wijngaarden | G06F 1/329 |
| 9,406,237 B2* | 8/2016 | Downey | G07C 5/0808 |
| 9,464,906 B1* | 10/2016 | Baughman | G09B 5/02 |
| 9,513,135 B2* | 12/2016 | MacNeille | G08G 1/09685 |
| 9,581,997 B1* | 2/2017 | Penilla | B60L 53/80 |
| 9,586,579 B1* | 3/2017 | Laskowsky | B60W 20/13 |
| 9,605,606 B2* | 3/2017 | Dufford | B60W 50/0097 |
| 9,663,111 B2* | 5/2017 | Kristinsson | B60W 50/0097 |
| 9,707,909 B2* | 7/2017 | Weinberg | B60R 16/0236 |
| 9,713,962 B2* | 7/2017 | Payne | B60L 11/1838 |
| 9,714,837 B2* | 7/2017 | North | G01C 21/3697 |
| 9,739,624 B2* | 8/2017 | Rajagopalan | G01C 21/3415 |
| 9,759,573 B2* | 9/2017 | Meyer | G01C 21/3469 |
| 9,784,590 B2* | 10/2017 | Englehardt | G01C 21/3469 |
| 9,868,332 B2* | 1/2018 | Anderson | B60N 2/501 |
| 9,884,630 B1* | 2/2018 | Ross | B60W 10/18 |
| 9,970,780 B2* | 5/2018 | Bai | G01C 21/3492 |
| 10,001,380 B2* | 6/2018 | Annapureddy | G06F 21/552 |
| 10,026,199 B2* | 7/2018 | Lindemann | H04L 67/12 |
| 10,099,569 B2* | 10/2018 | Lindemann | B60L 58/13 |
| 10,160,340 B2* | 12/2018 | Lindemann | B60L 58/16 |
| 10,464,547 B2* | 11/2019 | Park | B60W 50/14 |
| 10,473,474 B2* | 11/2019 | Rajagopalan | G01C 21/3469 |
| 10,591,302 B2* | 3/2020 | Naylor | G16H 20/30 |
| 10,809,733 B2* | 10/2020 | Lindemann | G01C 21/3469 |
| 2008/0052145 A1* | 2/2008 | Kaplan | G06Q 50/06 705/7.12 |
| 2008/0221787 A1* | 9/2008 | Vavrus | G01C 21/3469 701/423 |
| 2010/0049397 A1* | 2/2010 | Liu | G01C 21/3469 701/31.4 |
| 2011/0238457 A1* | 9/2011 | Mason | G06Q 10/063112 705/7.14 |
| 2012/0004838 A1* | 1/2012 | Lee | G08G 1/096844 701/123 |
| 2012/0232783 A1* | 9/2012 | Calkins | G01C 21/3469 701/411 |
| 2013/0261914 A1* | 10/2013 | Ingram | B64D 27/24 701/70 |
| 2014/0211345 A1* | 7/2014 | Thompson | H02H 3/33 361/42 |
| 2015/0276420 A1* | 10/2015 | McGee | G01C 21/3469 701/118 |
| 2016/0084665 A1* | 3/2016 | Englehardt | G06F 16/29 701/533 |
| 2016/0245662 A1* | 8/2016 | Rajagopalan | G01C 21/3469 |
| 2017/0282736 A1* | 10/2017 | Goei | B60L 53/665 |
| 2017/0285641 A1* | 10/2017 | Goldman-Shenhar | B60W 20/00 |
| 2018/0045527 A1* | 2/2018 | Baker | G01C 21/3617 |
| 2018/0058868 A1* | 3/2018 | Kang | B60W 20/12 |
| 2018/0356242 A1* | 12/2018 | Kritzmacher | B60W 50/0097 |
| 2019/0016329 A1* | 1/2019 | Park | B60L 3/12 |

FOREIGN PATENT DOCUMENTS

| | | | | |
|---|---|---|---|---|
| CN | 107111473 A | * | 8/2017 | G06F 3/0346 |
| CN | 107264326 A | * | 10/2017 | G06F 3/0346 |
| EP | 2428770 A1 | * | 3/2012 | G01C 21/32 |
| EP | 2431711 A1 | * | 3/2012 | G01C 21/3469 |
| WO | WO-2014158411 A1 | * | 10/2014 | G06F 21/572 |
| WO | WO-2019080711 A1 | * | 5/2019 | G06N 5/003 |

* cited by examiner

VEHICLE ENERGY USAGE TRACKING

INTRODUCTION

The present invention relates to tracking the energy usage of a vehicle and updating a predicted energy usage model based on actual energy usage of the vehicle.

Vehicles include hardware and software capable of obtaining and processing various information, including information that is obtained by vehicle system modules (VSMs). Moreover, vehicles include networking capabilities and can be connected to a vehicle backend server that maintains accounts for users and their vehicles. Also, some vehicles now include a primary propulsion system that uses stored electrical energy, such as a battery. Integrating the various sources of vehicle information in particular ways can help promote more efficient use of the primary propulsion system.

SUMMARY

According to one aspect of the invention, there is provided a method of building an energy usage prediction model, obtaining a planned route for a vehicle that contains one or more planned route segments, applying the energy usage prediction model to each planned route segment of the one or more planned route segments of the planned route to obtain an energy usage plan, receiving onboard data from the vehicle, constructing an actual route based on the onboard data, and performing a match analysis between the planned route and the actual route based on the onboard data.

According to various embodiments, this method may further include any one of the following features or any technically-feasible combination of some or all of these features:
  route information including a route start location and a route end location are obtained from the vehicle, and wherein the route information is used to obtain the planned route for the vehicle;
  the energy usage plan includes one or more planned route segments, each of the one or more planned route segments having associated predicted energy usage information;
  the match analysis includes matching a planned route segment of the planned route to an actual route segment of the actual route based at least partly on geographical proximity between the planned route and the actual route;
  the step of re-calibrating the energy usage plan based on route matching feedback information, the route matching feedback information including energy usage information obtained from the vehicle;
  the route matching feedback information includes at least some of the onboard data received from the vehicle, the at least some onboard data is associated with a geographical point along the actual route segment that is matched to the planned route segment, and the at least some onboard data includes the energy usage information;
  the match analysis includes tentatively matching a first actual route segment of the actual route to a first planned route segment of the planned route to obtain a tentative match and wherein the match analysis includes confirming the tentative match to obtain a confirmed match upon tentatively matching a second actual route segment to a second planned route segment, the second actual route segment being further along the actual route than the first actual route segment, and the second planned route segment being further along the planned route than the first planned route segment;
  confirming the tentative match as a detour match when a match displacement between the first actual route segment and the second actual route segment is greater than a predetermined detour displacement threshold; and/or
  the method is carried out by one or more servers located at a vehicle backend services facility, the one or more servers each including a processor, and wherein the one or more servers include computer instructions that, when executed, cause the processors to carry out the method steps.

According to another aspect of the invention, there is provided a method of tracking energy usage for a vehicle, comprising the steps of receiving route information from a vehicle, the route information including a route start location and a route end location; obtaining a planned route based on the route information, wherein the planned route includes a plurality of planned route segments; generating predicted energy usage information for each of the plurality of planned route segments, the predicted energy usage information being based on onboard data received from the vehicle and off-board data obtained from a database; receiving energy usage data from the vehicle, wherein the energy usage data is associated with an actual route segment; matching the actual route segment to one of the plurality of planned route segments to obtain a matched route segment pair, the matched route segment pair including the actual route segment and the planned route segment that is matched to the actual route segment, and wherein the matching is based at least partly on geographical proximity between the actual route segment; and updating the predicted energy usage information for a subset of planned route segments, wherein the subset of planned route segments includes one or more of the plurality of planned route segments that are further along the planned route than the planned route segment of the matched route segment pair.

According to various embodiments, this method may further include any one of the following features or any technically-feasible combination of some or all of these features:
  the onboard data received from the vehicle includes a state of charge (SoC) value of a battery pack of the vehicle as well as heating, ventilation, and air conditioning (HVAC) information;
  the updating step is based on at least part of the energy usage data received from the vehicle;
  the subset of planned route segments that are updated includes all of the plurality of planned route segments that are further along the planned route than the planned route segment of the matched route segment pair;
  the updating step includes generating predicted energy usage information for each planned route segment in the subset of planned route segments; and/or
  the matched route segment pair along with corresponding energy usage information is inputted into a learning model that generates model calibration information, the corresponding energy usage information including at least some of the energy usage data received from the vehicle and the predicted energy usage information associated with the planned route segment of the matched route segment pair, and wherein the model calibration information is generated based at least in part on the corresponding energy usage information.

According to yet another aspect of the invention, there is provided a vehicle energy usage tracking system, comprising: a server that includes a processor and computer-readable memory, the computer-readable memory storing a computer program; and a database that is accessible by the server, the database storing off-board vehicle information; wherein the computer program, when executed by the processor, causes the server to: build an energy usage prediction model, obtain a planned route for a vehicle, the planned route containing one or more planned route segments, apply the energy usage prediction model to each planned route segment of the one or more planned route segments of the planned route to obtain an energy usage plan, receive onboard data from the vehicle, construct an actual route based on the onboard data, and perform a match analysis between the planned route and the actual route based on the onboard data.

According to various embodiments, this system may further include any one of the following features or any technically-feasible combination of some or all of these features:
- the match analysis includes tentatively matching a first actual route segment of the actual route to a first planned route segment of the planned route to obtain a tentative match and wherein the match analysis includes confirming the tentative match to obtain a confirmed match upon tentatively matching a second actual route segment to a second planned route segment, the second actual route segment being further along the actual route than the first actual route segment, and the second planned route segment being further along the planned route than the first planned route segment;
- the match analysis includes matching a planned route segment of the planned route to an actual route segment of the actual route based at least partly on geographical proximity between the planned route and the actual route;
- the computer program, when executed by the processor, further causes the server to update the energy usage plan based on route matching feedback information, the route matching feedback information including energy usage information obtained from the vehicle; and/or
- the route matching feedback information includes at least some of the onboard data received from the vehicle, the at least some onboard data is associated with a geographical point along the actual route segment that is matched to the planned route segment, and the at least some onboard data includes the energy usage information.

BRIEF DESCRIPTION OF THE DRAWINGS

One or more embodiments of the invention will hereinafter be described in conjunction with the appended drawings, wherein like designations denote like elements, and wherein.

DETAILED DESCRIPTION

The system and method described below enables the tracking of energy usage for a vehicle and updating an energy usage prediction plan for a route of the vehicle as the vehicle travels along the route. In one embodiment, a vehicle user can operate an onboard navigation system of the vehicle, and can input a destination. Then, the vehicle sends the destination (and/or other route information, such as the vehicle's present location or other start location) to a vehicle backend services facility. The vehicle backend services facility determines a route along which the vehicle is suggested or predicted to travel so as to reach the destination, and this suggested or predicted route can be referred to as a "planned route." Additionally, at this time, the vehicle backend services facility determines an energy usage prediction plan of the vehicle along the route, which is organized by a plurality of planned route segments that are each associated with a predicted energy usage information. The planned route segments along with the associated predicted energy usage information can together be referred to as an "energy usage prediction plan." The energy usage prediction plan (or only the planned route) can be sent to the vehicle, which can then display the planned route on a display within the vehicle. As the vehicle travels, the vehicle can send position information (e.g., global navigation satellite system (GNSS) information) back to the vehicle backend services facility along with vehicle sensor information, including, for example, a state of charge (SoC) of a primary propulsion vehicle battery. The vehicle backend services facility then matches an actual segment to a planned route segment of the energy usage prediction plan based on the information received from the vehicle and, also, the vehicle backend services facility updates energy usage prediction information for "downstream" or to-be-encountered route segments (i.e., planned route segments that are further down the planned route). Then, the vehicle backend services facility can provide this updated energy usage prediction plan back to the vehicle. In one embodiment, the SoC may be predicted upon arrival and departure from a charge spot and be adapted during the route for various unforeseen circumstances.

The vehicle backend services facility can calculate or otherwise determine the energy usage prediction plan for the vehicle along the planned route based on a variety of factors, including historical energy usage data for the vehicle or vehicles of a similar nature along one or more route segments, vehicle starting operating conditions, weather, geography (including topography), and/or traffic conditions.

Figure 1:
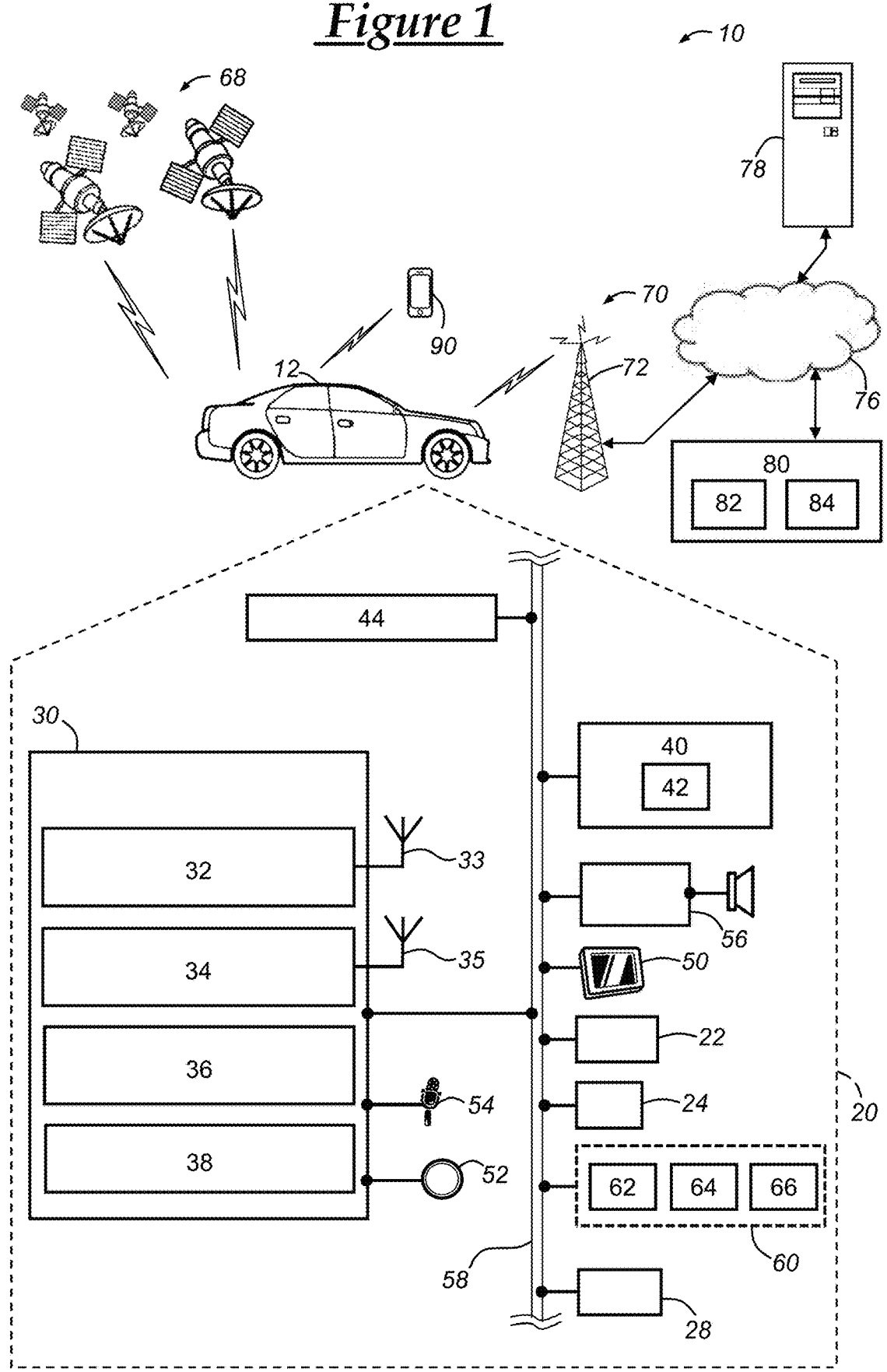
FIG. 1 is a block diagram depicting an embodiment of a communications system that is capable of utilizing the method disclosed herein.

With reference to FIG. 1, there is shown an operating environment that comprises a communications system 10 and that can be used to implement the method disclosed herein. Communications system 10 generally includes a vehicle 12 with a wireless communications device 30 and other VSMs 22-66, a constellation of global navigation satellite system (GNSS) satellites 68, one or more wireless carrier systems 70, a land communications network 76, a computer or server 78, and a vehicle backend services facility 80. It should be understood that the disclosed method can be used with any number of different systems and is not specifically limited to the operating environment shown here. Also, the architecture, construction, setup, and general operation of the system 10 and its individual components are generally known in the art. Thus, the following paragraphs simply provide a brief overview of one such communications system 10; however, other systems not shown here could employ the disclosed methods as well.

Wireless carrier system 70 may be any suitable cellular telephone system. Carrier system 70 is shown as including a cellular tower 72; however, the carrier system 70 may include one or more of the following components (e.g., depending on the cellular technology): cellular towers, base transceiver stations, mobile switching centers, base station controllers, evolved nodes (e.g., eNodeBs), mobility management entities (MMEs), serving and PGN gateways, etc., as well as any other networking components required to connect wireless carrier system 70 with the land network 76 or to connect the wireless carrier system with user equipment (UEs, e.g., which can include telematics equipment in vehicle 12). Carrier system 70 can implement any suitable communications technology, including GSM/GPRS technology, CDMA or CDMA2000 technology, LTE technology, etc. In general, wireless carrier systems 70, their components, the arrangement of their components, the interaction between the components, etc. is generally known in the art.

Apart from using wireless carrier system 70, a different wireless carrier system in the form of satellite communication can be used to provide uni-directional or bi-directional communication with the vehicle. This can be done using one or more communication satellites (not shown) and an uplink transmitting station (not shown). Uni-directional communication can be, for example, satellite radio services, wherein programming content (news, music, etc.) is received by the uplink transmitting station, packaged for upload, and then sent to the satellite, which broadcasts the programming to subscribers. Bi-directional communication can be, for example, satellite telephony services using the one or more communication satellites to relay telephone communications between the vehicle 12 and the uplink transmitting station. If used, this satellite telephony can be utilized either in addition to or in lieu of wireless carrier system 70.

Land network 76 may be a conventional land-based telecommunications network that is connected to one or more landline telephones and connects wireless carrier system 70 to vehicle backend services facility 80. For example, land network 76 may include a public switched telephone network (PSTN) such as that used to provide hardwired telephony, packet-switched data communications, and the Internet infrastructure. One or more segments of land network 76 could be implemented through the use of a standard wired network, a fiber or other optical network, a cable network, power lines, other wireless networks such as wireless local area networks (WLANs), or networks providing broadband wireless access (BWA), or any combination thereof.

Computers 78 (only one shown) can be some of a number of computers accessible via a private or public network such as the Internet. In one embodiment, each such computer 78 can be used for one or more purposes, such as for providing navigational services to a plurality of vehicles and other electronic network computing devices, including vehicle 12 and personal mobile device 90. Other such accessible computers 78 can be, for example: a service center computer where diagnostic information and other vehicle data can be uploaded from the vehicle; a client computer used by the vehicle owner or other subscriber for such purposes as accessing or receiving vehicle data or to setting up or configuring subscriber preferences or controlling vehicle functions; a car sharing server which coordinates registrations from a plurality of users who request to use a vehicle as part of a car sharing service; or a third party repository to or from which vehicle data or other information is provided, whether by communicating with the vehicle 12, backend facility 80, or both. A computer 78 can also be used for providing Internet connectivity such as DNS services or as a network address server that uses DHCP or other suitable protocol to assign an IP address to vehicle 12.

Vehicle backend services facility 80 is a backend facility and is located at a physical location that is located remotely from vehicle 12. The vehicle backend services facility 80 (or "backend facility 80" for short) may be designed to provide the vehicle electronics 20 with a number of different system back-end functions through use of one or more electronic servers 82 and, in many cases, may provide navigation-related services to a plurality of vehicles. In many embodiments, the backend facility 80 provides route suggestions (or a planned route), along with an energy usage prediction plan that is continuously updated based on feedback from the vehicle 12 as the vehicle travels, as described in more detail below. The vehicle backend services facility 80 includes vehicle backend services servers 82 and databases 84, which may be stored on a plurality of memory devices. Vehicle backend services facility 80 may include any or all of these various components and, preferably, each of the various components are coupled to one another via a wired or wireless local area network. Backend facility 80 may receive and transmit data via a modem connected to land network 76. Data transmissions may also be conducted by wireless systems, such as IEEE 802.11x, GPRS, and the like. Those skilled in the art will appreciate that, although only one backend facility 80 and one computer 78 are depicted in the illustrated embodiment, numerous remote facilities 80 and/or computers 78 may be used. Moreover, a plurality of backend facilities 80 and/or computers 78 can be geographically distributed and can each coordinate information and services with one another, as those skilled in the art will appreciate.

Servers 82 can be computers or other computing devices that include at least one processor and that include memory. The processors can be any type of device capable of processing electronic instructions including microprocessors, microcontrollers, host processors, controllers, vehicle communication processors, and application specific integrated circuits (ASICs). The processors can be dedicated processors used only for servers 82 or can be shared with other systems. The at least one processor can execute various types of digitally-stored instructions, such as software or firmware, which enable the servers 82 to provide a wide variety of services. This software may be stored in computer-readable memory and can be any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. For network communications (e.g., intra-network communications, inter-network communications including Internet connections), the servers can include one or more network interface cards (NICs) (including wireless NICs (WNICs)) that can be used to transport data to and from the computers. These NICs can allow the one or more servers 82 to connect with one another, databases 84, or other networking devices, including routers, modems, and/or switches. In one particular embodiment, the NICs (including WNICs) of servers 82 may allow SRWC connections to be established and/or may include Ethernet (IEEE 802.3) ports to which Ethernet cables may be connected to that can provide for a data connection between two or more devices. Backend facility 80 can include a number of routers, modems, switches, or other network devices that can be used to provide networking capabilities, such as connecting with land network 76 and/or cellular carrier system 70.

Databases 84 can be stored on a plurality of memory, such as a powered temporary memory or any suitable non-transitory, computer-readable medium. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives, that stores some or all of the software needed to carry out the various external device functions discussed herein. One or more databases at the backend facility 80 can store various information and can include a vehicle energy usage database, geographical roadway information database, and other vehicle information database(s).

The vehicle energy usage database can include various information for use in vehicle energy usage prediction application, as discussed more below. The vehicle energy usage information that is stored on the vehicle energy usage database can include historical energy usage information. In at least one embodiment, the historical energy usage information includes actual energy usage metrics from a fleet of vehicles. These actual energy usage metrics can include an amount of energy that was used by a vehicle for a particular roadway segment. A roadway segment is a segment or portion of a roadway. In some instances, vehicles may travel off-road or on the earth along undesignated roadways; this information can be stored in the vehicle energy usage database and these paths may be considered roadway segments, at least in one embodiment. The actual energy usage metrics and associated roadway segments can also be associated with a particular vehicle, a particular vehicle model (and/or model-year), a particular type of vehicle (e.g., four-door sedan, sport utility vehicle (SUV), car, truck), or other vehicle specification information. The roadway segments can be defined by one or more geographical locations or coordinate pairs. For example, polar coordinates defining a single geographical coordinate pair (i.e., the pole), radius, and the polar angle can be used to define the roadway segments. In another embodiment, a plurality of geographical coordinate pairs can be used, such as two coordinate pairs. The coordinate pairs can include geographical coordinate information that is received from the vehicle and that is generated at the vehicle through use of global navigation satellite system (GNSS) services (e.g., through use of GNSS receiver 22). The vehicles in the fleet can then report their energy usage (as discussed more below) and their location back to the remote facility, which can store the information into the vehicle energy usage database.

As mentioned, the vehicle energy usage database can associate actual energy usage metrics with roadway segments and vehicle specification information. The vehicle specification information can include information concerning specifications of the vehicle, such as make, model, model-year, standard features, optional features, aftermarket features, propulsion system types (e.g., electric, hybrid, internal combustion engine (ICE)), battery type, number of battery cells, other vehicle system module (VSM) information (e.g., vehicle sensor information), vehicle networking information, and various other information pertaining to a fleet of vehicles or a particular vehicle, such as the vehicle 12. It should be appreciated that any or all of the information stored in the vehicle energy usage database can be stored at one or more databases at one or more locations or facilities, and which may be operated and/or managed by one or more associated entities, including an OEM of the vehicles.

Additionally, in one embodiment, databases 84 can include geographical map information including geographical roadway map data that digitally represents geographical areas including roadways on the surface of earth. The geographical roadway map data includes data representing geographical regions and roadways among one or more geographical regions. The geographical roadway map data can include various additional information, such as roadway dimensions and geometries (i.e., information representing geographical areas in which roadways are located), roadway attributes (e.g., speed limit, permitted direction of travel, lane information, traffic signal information), roadway conditions (e.g., present or estimated traffic conditions, predicted and/or observed weather conditions along the roadway), and various other information. Any of the geographic roadway map data can be associated with geographical coordinates or other location-identifying information that can be used to tie the data to a particular geographical point or area. Other information can be stored at the vehicle backend services facility 80, including account information such as vehicle services subscriber information (e.g., credentials and authentication information), vehicle identifiers, vehicle transactional information, geographical coordinates of the vehicle, and other vehicle information. The geographical roadway map data can also include geographical or topographical map data that represents other features of the earth, such as altitude of the earth or estimated grade of the roadway. Any or all of this information can be included and/or associated with information stored in the vehicle energy usage database, as discussed above. Moreover, this information can be stored as a part of the vehicle energy usage database, or may be stored in a separate database at the remote facility 80 or at another server, such as computer 78 or another remote facility.

Vehicle 12 is depicted in the illustrated embodiment as a passenger car, but it should be appreciated that any other vehicle including motorcycles, trucks, sports utility vehicles (SUVs), recreational vehicles (RVs), marine vessels, aircraft, etc., can also be used. Some of the vehicle electronics 20 are shown generally in FIG. 1 and includes a global navigation satellite system (GNSS) receiver 22, body control module or unit (BCM) 24, other vehicle system modules (VSMs) 28, a wireless communications device 30, HVAC system 40, thermometer 42, movement sensor(s) 44, vehicle-user interfaces 50-56, and battery system 60. In the illustrated embodiment, the vehicle 12 is an electric vehicle that primarily uses the battery system 60 for propulsion. However, in other embodiments, the vehicle 12 can be a hybrid (e.g., a plug-in hybrid electric vehicle (PHEV)) or an internal combustion engine (ICE) vehicle. Some or all of the different vehicle electronics may be connected for communication with each other via one or more communication busses, such as bus 58. Communications bus 58 provides the vehicle electronics with network connections using one or more network protocols. Examples of suitable network connections include a controller area network (CAN), a media oriented system transfer (MOST), a local interconnection network (LIN), a local area network (LAN), and other appropriate connections such as Ethernet or others that conform with known ISO, SAE and IEEE standards and specifications, to name but a few. In other embodiments, each of the VSMs can communicate using a wireless network and can include suitable hardware, such as short-range wireless communications (SRWC) circuitry.

The vehicle 12 can include numerous vehicle system modules (VSMs) as part of vehicle electronics 20, such as the GNSS receiver 22, BCM 24, wireless communications device 30, HVAC system 40, thermometer 42, movement sensor(s) 44, vehicle-user interfaces 50-56, and battery system 60, as will be described in detail below. The vehicle 12 can also include other VSMs 28 in the form of electronic hardware components that are located throughout the vehicle and, which may receive input from one or more sensors and use the sensed input to perform diagnostic, monitoring, control, reporting, and/or other functions. Each of the VSMs 28 is connected by communications bus 58 to the other VSMs, as well as to the wireless communications device 30. One or more VSMs 28 may periodically or occasionally have their software or firmware updated and, in some embodiments, such vehicle updates may be over the air (OTA) updates that are received from a computer 78 or backend facility 80 via land network 76 and communications device 30. As is appreciated by those skilled in the art, the above-mentioned VSMs are only examples of some of the modules that may be used in vehicle 12, as numerous others are also possible.

Global navigation satellite system (GNSS) receiver 22 receives radio signals from a constellation of GNSS satellites. GNSS receiver 22 can be configured to comply with and/or operate according to particular regulations or laws of a given geopolitical region (e.g., country). The GNSS receiver 22 can be configured for use with various GNSS implementations, including global positioning system (GPS) for the United States, BeiDou Navigation Satellite System (BDS) for China, Global Navigation Satellite System (GLONASS) for Russia, Galileo for the European Union, and various other navigation satellite systems. For example, the GNSS receiver 22 may be a GPS receiver, which may receive GPS signals from a constellation of GPS satellites 68. And, in another example, GNSS receiver 22 can be a BDS receiver that receives a plurality of GNSS (or BDS) signals from a constellation of GNSS (or BDS) satellites 68. In either implementation, GNSS receiver 22 can include at least one processor and memory, including a non-transitory computer readable memory storing instructions (software) that are accessible by the processor for carrying out the processing performed by the receiver 22.

GNSS receiver 22 may be used to provide navigation and other position-related services to the vehicle operator. Navigation information can be presented on the display 50 (or other display within the vehicle such as an application program on mobile device 90) or can be presented verbally such as is done when supplying turn-by-turn navigation. The navigation services can be provided using a dedicated in-vehicle navigation module (which can be part of GNSS receiver 22 and/or incorporated as a part of wireless communications device 30 or other VSM), or some or all navigation services can be done via the vehicle communications device (or other telematics-enabled device) installed in the vehicle, wherein the position or location information is sent to a remote location for purposes of providing the vehicle with navigation maps, map annotations (points of interest, restaurants, etc.), route calculations, and the like. The position information can be supplied to the vehicle backend services facility 80 or other remote computer system, such as computer 78, for other purposes, such as fleet management and/or for use in the vehicle energy usage prediction application discussed below. Also, new or updated map data, such as that geographical roadway map data stored on databases 84, can be downloaded to the GNSS receiver 22 from the backend facility 80 via vehicle communications device 30, as well as energy usage prediction information and/or planned route information.

Body control module (BCM) 24 can be used to control various VSMs of the vehicle, as well as obtain information concerning the VSMs, including their present state or status, as well as sensor information. BCM 24 is shown in the exemplary embodiment of FIG. 1 as being electrically coupled to communication bus 58. In some embodiments, the BCM 24 may be integrated with or part of a center stack module (CSM) and/or integrated with wireless communications device 30. Or, the BCM may be a separate device that is connected to other VSMs via bus 58. BCM 24 can include a processor and/or memory, which can be similar to processor 36 and memory 38 of wireless communications device 30, as discussed below. BCM 24 may communicate with wireless device 30 and/or one or more vehicle system modules, such as the HVAC system 40, thermometer 42, movement sensor(s) 44, audio system 56, battery system 60, or other VSMs 28. BCM 24 may include a processor and memory accessible by the processor. Suitable memory may include non-transitory computer-readable memory that includes various forms of non-volatile RAM and ROM. Software stored in the memory and executable by the processor enables the BCM to direct one or more vehicle functions or operations including, for example, controlling central locking, air conditioning (or other HVAC functions), power mirrors, controlling the vehicle primary mover (e.g., engine, primary propulsion system), and/or controlling various other vehicle modules. For example, the BCM 24 can send signals to other VSMs, such as a request to perform a particular operation or a request for sensor information and, in response, the sensor may then send back the requested information. And, the BCM 24 may receive data from VSMs, including HVAC sensor and settings information from HVAC system 40, temperature or other climate information from thermometer 42, movement sensor information from movement sensor 44, battery information from battery system 60, and various other information from other VSMs.

Additionally, the BCM 24 may provide vehicle state information corresponding to the vehicle state or of certain vehicle components or systems, including the VSMs discussed herein. For example, the BCM 24 may provide the device 30 with information indicating whether the vehicle's primary propulsion system is engaged or in an active (or ready) state (or when the ignition is turned on as received from an engine control module in an ICE vehicle), battery information from the battery system 60, and/or other information regarding the vehicle. The information can be sent to the wireless communications device 30 (or other central vehicle computer) automatically upon receiving a request from the device/computer, automatically upon certain conditions being met, or periodically (e.g., at set time intervals). As discussed in more detail below, the BCM 24 can be configured with one or more triggers that, when a condition is satisfied, the BCM performs some operation, such as sending sensor information to the wireless communications device 30 (or to another device or entity, such as backend facility 80). In this way, the BCM 24 can filter information based on predetermined or predefined triggers and pass the filtered information on to other VSMs, including the wireless communications device 30 (or other central vehicle computer).

In an alternative embodiment, the vehicle 12 can include an internal combustion engine (ICE) and, in such cases, can be referred to as an ICE vehicle. These ICE vehicles can solely use an ICE for propulsion or may use a combination of another energy store (such as a battery) and the ICE. In the case of an ICE vehicle, the vehicle can include an engine control module (ECM) that controls various aspects of engine operation such as fuel ignition and ignition timing. The ECM can be connected to communications bus 58 and may receive operation instructions from BCM 24 or other vehicle system modules, such as wireless communications device 30 or VSMs 28. In one scenario, the ECU may receive a command from the BCM to initiate the ICE. The ECM can also be used to obtain sensor information of the vehicle engine.

The vehicle 12 includes various onboard vehicle sensors 40-44 and 64-66. Also, certain vehicle-user interfaces 50-54 can be utilized as onboard vehicle sensors. Generally, the sensors 40-44, 64-66 can obtain information pertaining to either the operating state of the vehicle (the "vehicle operating state") or the environment of the vehicle (the "vehicle environmental state"). The sensor information can be sent to other VSMs, such as BCM 24 and the vehicle communications device 30, via communications bus 58. Also, in some embodiments, the sensor data can be sent with metadata, which can include data identifying the sensor (or type of sensor) that captured the sensor data, a timestamp (or other time indicator), and/or other data that pertains to the sensor data, but that does not make up the sensor data itself. The "vehicle operating state" refers to a state of the vehicle concerning the operation of the vehicle, which can include the operation of the primary mover (e.g., a vehicle engine, vehicle propulsion motors). Additionally, the vehicle operating state can include the vehicle state concerning mechanical operations of the vehicle or electrical states of the vehicle. The "vehicle environmental state" refers to a vehicle state concerning the interior of the cabin and the nearby, exterior area surrounding the vehicle. The vehicle environmental state includes behavior of a driver, operator, or passenger, as well as traffic conditions, roadway conditions and features, and statuses of areas nearby the vehicle.

The heating, ventilation, and air conditioning (HVAC) system 40 can be used to provide heating and air conditioning to an interior cabin or passenger cabin of the vehicle 12. The HVAC system 40 can include a compressor, a condenser, an evaporator, a thermometer 42, a heating core, a blower fan, and an HVAC control system, as well as various other components. The HVAC control system can be incorporated with another VSM of the vehicle 12, or may include separate components. And, in some embodiments, the HVAC system can be at least partly incorporated into another VSM, but can also include separate circuitry used for controlling the HVAC system 40. In addition to the thermometer 42, the HVAC system 40 can include a variety of sensors, such as pressure sensors. Sensor readings from these onboard sensors can be sent to other vehicle modules, such as the wireless communications device 30. The HVAC control state can be represented using HVAC control data that indicates present HVAC setting(s) or options. Moreover, HVAC sensor data can include sensor data obtained from one or more onboard vehicle sensors that are a part of (or at least used as a part of) the HVAC system 40. The HVAC control data and the HVAC sensor data can be referred to collectively as HVAC data. The HVAC data can also include HVAC operational data, which is data that concerns the HVAC system, such as blower fan speed and other HVAC parameters or operating conditions. Thus, the HVAC data can include HVAC control data, the HVAC sensor data, HVAC operational data, or a combination thereof.

The thermometer 42 is a digital thermometer that can detect the temperature of the air within an interior cabin of the vehicle 12, such as within a passenger cabin of the vehicle. In other embodiments, the thermometer 42 can be another temperature sensing device. In the illustrated embodiment, the thermometer 42 is a part of the HVAC system 40 and can be used to provide information to the HVAC control system, as well as provide information to one or more users of the vehicle via display 50 or other vehicle-user interface. In other embodiments, the thermometer 42 can be separate from the HVAC system 40, or a second (or additional) thermometers can be included in the vehicle 12 with at least one thermometer being used as a part of the HVAC system 40. In one embodiment, the vehicle 12 can include an interior thermometer that measures the temperature of an interior cabin of the vehicle 12 (e.g., a passenger cabin) and an exterior thermometer that measures an ambient temperature outside of the vehicle 12. Additionally, in at least some embodiments, the vehicle 12 can include a transmission thermometer that measures the temperature of the transmission. In other embodiments when an ICE vehicle is used, thermometers can be used to measure engine temperature. These sensor readings from the thermometers can be sent to other VSMs, such as wireless communications device 30. The wireless communications device 30 can then send these sensor values to backend facility 80 or other remote system.

The movement sensors 44 can be used to obtain movement or inertial information concerning the vehicle, such as vehicle speed, acceleration, yaw (and yaw rate), pitch, roll, and various other attributes of the vehicle concerning its movement as measured locally through use of onboard vehicle sensors. The movement sensors 44 can be mounted on the vehicle in a variety of locations, such as within an interior vehicle cabin, on a front or back bumper of the vehicle, and/or on the hood of the vehicle 12. The movement sensors 44 can be coupled to various other VSMs directly or via communications bus 58. Movement sensor data can be obtained and sent to the other VSMs, including BCM 24 and/or wireless communications device 30.

In one embodiment, the movement sensors can include wheel speed sensors that are each coupled to a wheel and that can determine a rotational speed of the respective wheel. The rotational speeds from various wheel speed sensors can then be used to obtain a linear or transverse vehicle speed. Additionally, in some embodiments, the wheel speed sensors can be used to determine acceleration of the vehicle. The wheel speed sensors can include a tachometer that is coupled to a vehicle wheel and/or other rotating member. In some embodiments, wheel speed sensors can be referred to as vehicle speed sensors (VSS) and can be a part of an anti-lock braking (ABS) system of the vehicle 12 and/or an electronic stability control program.

Additionally, the movement sensors 44 can include one or more inertial sensors that can be used to obtain sensor information concerning the acceleration and the direction of the acceleration of the vehicle. The inertial sensors can be microelectromechanical systems (MEMS) sensor or accelerometer that obtains inertial information relating to levels of acceleration or braking. In one embodiment, the vehicle 12 can include a plurality of inertial sensors located throughout the vehicle. And, in some embodiments, each of the inertial sensors can be a multi-axis accelerometer that can measure acceleration or inertial force along a plurality of axes. The plurality of axes may each be orthogonal or perpendicular to one another and, additionally, one of the axes may run in the direction from the front to the back of the vehicle 12. Other embodiments may employ single-axis accelerometers or a combination of single- and multi-axis accelerometers. Other types of sensors can be used, including other accelerometers, gyroscope sensors, and/or other inertial sensors that are known or that may become known in the art.

The movement sensors 44 can also include a steering wheel angle sensor that is coupled to a steering wheel of vehicle 12 or a component of the steering wheel, including any of those that are a part of the steering column. The steering wheel angle sensor can detect the angle that a steering wheel is rotated, which can correspond to the angle of one or more vehicle wheels with respect to a longitudinal axis of vehicle 12 that runs from the back to the front. Sensor data and/or readings from the steering wheel angle sensor can be used in a control program that can be executed on a processor of BCM 24 or processor 36.

The movement sensors 44 can include one or more yaw rate sensors that obtain vehicle angular velocity information with respect to a vertical axis of the vehicle. The yaw rate sensors can include gyroscopic mechanisms that can determine the yaw rate and/or the slip angle. Various types of yaw rate sensors can be used, including micromechanical yaw rate sensors and piezoelectric yaw rate sensors. The movement sensors 44 can include various other sensors not explicitly mentioned here, including throttle positions sensors or brake pedal position sensors and other sensors contributing to a change in movement (i.e., a change in direction or propulsion, as indicated by a sensor reading of a vehicle operation or as indicated by receiving an input that (typically) results in a change in direction or propulsion).

The battery system 60 is included as a part of the vehicle electronics 20 and includes an electric battery pack 62, a battery SoC sensor 64, and a battery temperature sensor 66. The electric battery pack 62 can be a traction battery or an electric-vehicle battery that is used to provide propulsion for the vehicle 12. As mentioned above, the vehicle 12 can be an electric vehicle or a hybrid vehicle and, in such cases, the vehicle 12 can include an electric battery pack 62. In other embodiments where an ICE vehicle is used, the vehicle may not include a battery used for propulsion. In the case of an ICE vehicle, a hybrid vehicle, or an electric vehicle, the vehicle can include a separate lower voltage battery (e.g., 12V) for powering various VSMs and other components of the vehicle electronics 20. The electric battery pack 62 can be a lithium-ion battery pack that includes a plurality of lithium-ion batteries. Other types of batteries could be used as appreciated by those skilled in the art.

The battery state of charge (SoC) sensor 64 is an onboard vehicle sensor and can be any of a variety of electrical components that can measure the state of charge of the electric battery pack 62. In one embodiment, the battery SoC sensor 64 can use (or can be) a voltage sensor, such as a dedicated voltmeter that is attached at a positive terminal of the battery pack 62 and at a negative terminal of the battery pack 62. In another embodiment, the battery SoC sensor 64 can use other techniques, such as chemical methodologies that can be used to measure the specific gravity of pH of the electrolytes contained within the battery pack 62, coulomb counting methodologies, Kalman filtering processes (e.g., using voltage and battery temperatures in a Kalman filtering process), pressure methodologies, or a combination thereof. The battery SoC sensor 64 can be configured in various ways, as appreciated by those skilled in the art. The battery SoC sensor 64 can provide sensor information to a computing device of the vehicle 12, such as the wireless communications device 30, for purposes of determining a SoC level, which can be represented as a percentage of the full-charge capacity of the electric battery pack 62.

The battery temperature sensor 66 can be a digital thermometer, such as thermometer 42, that is coupled to the electric battery pack 62 such that the battery temperature sensor 66 can measure a temperature of the electric battery pack 62. In one embodiment, the battery temperature sensor 66 can be used to obtain a SoC of the electric battery pack 62, or may be a part of the battery SoC sensor 64 and used in combination with other sensors, such as a voltmeter.

Additionally, the vehicle 12 can include other sensors not mentioned above, including cameras, parking sensors, lane change and/or blind spot sensors, lane assist sensors, ranging sensors (i.e., sensors used to detect the range between the vehicle and another object, such as through use of radar or lidar), other radars, other lidars, tire-pressure sensors, fluid level sensors (including a fuel level sensor), brake pad wear sensors, V2V communication unit (which may be integrated into the wireless communications device 30, as discussed below), rain or precipitation sensors (e.g., infrared light sensor(s) directed toward the windshield (or other window of the vehicle 12) to detect rain or other precipitation based on the amount of reflected light), and interior or exterior temperature sensors.

Wireless communications device 30 is capable of communicating data via short-range wireless communications (SRWC) and/or via cellular network communications through use of a cellular chipset 34, as depicted in the illustrated embodiment. In one embodiment, the wireless communications device 30 is a central vehicle computer that is used to carry out at least part of the method discussed below. In the illustrated embodiment, wireless communications device 30 includes an SRWC circuit 32, a cellular chipset 34, a processor 36, memory 38, and antennas 33 and 35. In one embodiment, wireless communications device 30 may be a standalone module or, in other embodiments, device 30 may be incorporated or included as a part of one or more other vehicle system modules, such as a center stack module (CSM), body control module (BCM) 24, an infotainment module, a head unit, and/or a gateway module. In some embodiments, the device 30 can be implemented as an OEM-installed (embedded) or aftermarket device that is installed in the vehicle. In some embodiments, the wireless communications device 30 is a telematics unit (or telematics control unit) that is capable of carrying out cellular communications using one or more cellular carrier systems 70. The telematics unit can be integrated with the GNSS receiver 22 so that, for example, the GNSS receiver 22 and the wireless communications device (or telematics unit) 30 are directly connected to one another as opposed to being connected via communications bus 58.

In some embodiments, the wireless communications device 30 can be configured to communicate wirelessly according to one or more short-range wireless communications (SRWC) such as any of the Wi-Fi™, WiMAX™, Wi-Fi Direct™, other IEEE 802.11 protocols, ZigBee™, Bluetooth™, Bluetooth™ Low Energy (BLE), or near field communication (NFC). As used herein, Bluetooth™ refers to any of the Bluetooth™ technologies, such as Bluetooth Low Energy™ (BLE), Bluetooth™ 4.1, Bluetooth™ 4.2, Bluetooth™ 5.0, and other Bluetooth™ technologies that may be developed. As used herein, Wi-Fi™ or Wi-Fi™ technology refers to any of the Wi-Fi™ technologies, such as IEEE 802.11b/g/n/ac or any other IEEE 802.11 technology. The short-range wireless communication (SRWC) circuit 32 enables the wireless communications device 30 to transmit and receive SRWC signals, such as BLE signals. The SRWC circuit may allow the device 30 to connect to another SRWC device. Additionally, in some embodiments, the wireless communications device may contain a cellular chipset 34 thereby allowing the device to communicate via one or more cellular protocols, such as those used by cellular carrier system 70. In such a case, the wireless communications device becomes user equipment (UE) usable in carrying out cellular communications via cellular carrier system 70.

Wireless communications device 30 may enable vehicle 12 to be in communication with one or more remote networks (e.g., one or more networks at backend facility 80 or computers 78) via packet-switched data communication. This packet-switched data communication may be carried out through use of a non-vehicle wireless access point that is connected to a land network via a router or modem. When used for packet-switched data communication such as TCP/IP, the communications device 30 can be configured with a static IP address or can be set up to automatically receive an assigned IP address from another device on the network such as a router or from a network address server.

Packet-switched data communications may also be carried out via use of a cellular network that may be accessible by the device 30. Communications device 30 may, via cellular chipset 34, communicate data over wireless carrier system 70. In such an embodiment, radio transmissions may be used to establish a communications channel, such as a voice channel and/or a data channel, with wireless carrier system 70 so that voice and/or data transmissions can be sent and received over the channel Data can be sent either via a data connection, such as via packet data transmission over a data channel, or via a voice channel using techniques known in the art. For combined services that involve both voice communication and data communication, the system can utilize a single call over a voice channel and switch as needed between voice and data transmission over the voice channel, and this can be done using techniques known to those skilled in the art.

Processor 36 can be any type of device capable of processing electronic instructions including microprocessors, microcontrollers, host processors, controllers, vehicle communication processors, and application specific integrated circuits (ASICs). It can be a dedicated processor used only for communications device 30 or can be shared with other vehicle systems. Processor 36 executes various types of digitally-stored instructions, such as software or firmware programs stored in memory 38, which enable the device 30 to provide a wide variety of services. For instance, processor 36 can execute programs or process data to carry out at least a part of the method discussed herein. Memory 38 may be a temporary powered memory, any non-transitory computer-readable medium, or other type of memory. For example, the memory can be any of a number of different types of RAM (random-access memory, including various types of dynamic RAM (DRAM) and static RAM (SRAM)), ROM (read-only memory), solid-state drives (SSDs) (including other solid-state storage such as solid state hybrid drives (SSHDs)), hard disk drives (HDDs), magnetic or optical disc drives. Similar components to those previously described (processor 36 and/or memory 38, as well as SRWC circuit 32 and cellular chipset 34) can be included in body control module 24 and/or various other VSMs that typically include such processing/storing capabilities.

The wireless communications device 30 is connected to the bus 58, and can receive sensor data from one or more onboard vehicle sensors 40-44, 64-66 and, thereafter, the vehicle can send this data (or other data derived from or based on this data) to other devices or networks, including the vehicle backend services facility 80. And, in another embodiment, the wireless communications device 30 can be incorporated with or at least connected to a navigation system that includes geographical map information including geographical roadway map data and/or a data from an energy usage prediction plan. The navigation system can be communicatively coupled to the GNSS receiver 22 (either directly or via communications bus 58) and can include an on-board geographical map database that stores local geographical map information. This local geographical map information can be provisioned in the vehicle and/or downloaded via a remote connection to a geographical map database/server, such as computer 78 and/or backend facility 80 (including servers 82 and databases 84). The on-board geographical map database can store geographical map information corresponding to a location or region of the vehicle so as to not include a large amount of data, much of which may never be used. Moreover, as the vehicle 12 enters different locations or regions, the vehicle can inform the vehicle backend services facility 80 of the vehicle's location (e.g., obtained via use of GNSS receiver 22) and, in response to receiving the vehicle's new location, the servers 82 can query databases 84 for the corresponding geographical map information, which can then be sent to the vehicle 12.

Vehicle electronics 20 also includes a number of vehicle-user interfaces that provide vehicle occupants with a means of providing and/or receiving information, including visual display 50, pushbutton(s) 52, microphone 54, and audio system 56. As used herein, the term "vehicle-user interface" broadly includes any suitable form of electronic device, including both hardware and software components, which is located on the vehicle and enables a vehicle user to communicate with or through a component of the vehicle. Vehicle-user interfaces 50-54 are also onboard vehicle sensors that can receive input from a user or other sensory information. The pushbutton(s) 52 allow manual user input into the communications device 30 to provide other data, response, or control input. Audio system 56 provides audio output to a vehicle occupant and can be a dedicated, stand-alone system or part of the primary vehicle audio system. According to the particular embodiment shown here, audio system 56 is operatively coupled to both vehicle bus 58 and an entertainment bus (not shown) and can provide AM, FM and satellite radio, CD, DVD and other multimedia functionality. This functionality can be provided in conjunction with or independent of an infotainment module. Microphone 54 provides audio input to the wireless communications device 30 to enable the driver or other occupant to provide voice commands and/or carry out hands-free calling via the wireless carrier system 70. For this purpose, it can be connected to an on-board automated voice processing unit utilizing human-machine interface (HMI) technology known in the art. Visual display or touch screen 50 is preferably a graphics display and can be used to provide a multitude of input and output functions. Display 50 can be a touch screen on the instrument panel, a heads-up display reflected off of the windshield, or a projector that can project graphics for viewing by a vehicle occupant. Various other vehicle-user interfaces can also be utilized, such as the mobile device 90, as the interfaces of FIG. 1 are only an example of one particular implementation.

A user of the vehicle 12 can use one or more vehicle-user interfaces, as discussed more below, to input a destination or other information. In one embodiment, the user can operate one or more vehicle-user interfaces 50-56, which can then deliver inputted information to other VSMs, such as the wireless communications device 30. The wireless communications device 30 can then send this information to the backend facility 80 using the cellular chipset 34 or other communications means. For example, the user can use the touchscreen display 50 to enter a desired destination to which the user would like to travel to. The destination can include a physical address (e.g., 1234 Main Street, Central City, Mich.) or can include a point of interest or other geographical indicator. The destination can be represented in many forms, such as through geographical coordinates or textual data that is embodied in a vehicle navigational request message. A departure location can also be specified in the vehicle navigational request message. The departure location can be specified by the user via the vehicle-user interfaces, or may be determined or preset to be the vehicle's current location, which can be determined using GNSS receiver 22 or through use of other location services. This vehicle navigational request message can then be sent using the wireless communications device 30 (e.g., through SRWC circuitry 32 or cellular chipset 34) to the backend facility 80 or other remote computing system (e.g., computer 78), which can then provide navigational information to the vehicle 12. This navigational information can be displayed on the display 50, or may be presented via use of other vehicle-user interfaces that can be used for presenting output. The navigational information can provide one or more route segments as well as geographical roadway map data. Moreover, the navigational information can include, or be accompanied by, an energy usage prediction plan or other energy usage information, as discussed more below.

Figure 2:
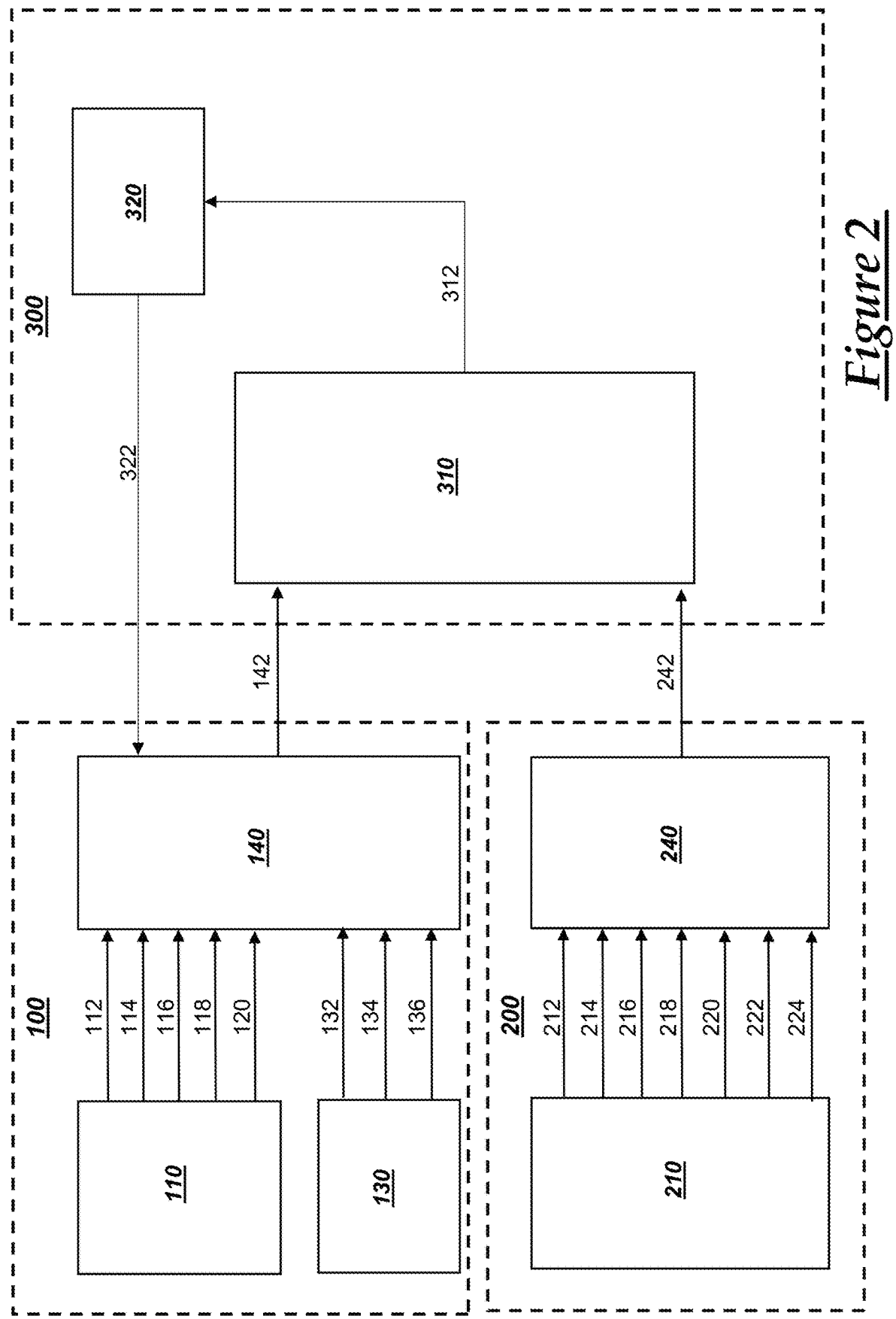
FIG. 2 is a block diagram depicting data flow for use in the method disclosed herein.

With reference to FIG. 2, there is shown a process flow for carrying out the energy prediction method discussed below. The process includes three phases: a planning phase 100, a driving phase 200, and a learning phase 300. The planning phase 100 can be used to develop an energy usage prediction plan based on off-board data 110 and onboard data 120 using an energy prediction modelling procedure 140. The driving phase 200 can use onboard data 210 as an input into the vehicle tracking procedure 240, which can be used to produce an actual energy usage model. Energy usage prediction information 142 from the energy usage prediction modelling procedure 140 and actual energy usage information 242 from the vehicle tracking procedure 240 can be input into a route tracking procedure 310 of the learning phase 300. In many embodiments, the energy usage prediction information 142 can include planned route segments along with associated predicted energy usage information, and the actual energy usage information 242 can include actual route segments along with associated sensed (or recorded) energy usage information. The route tracking procedure 310 can match the planned route segments to the actual route segments. The energy usage associated with these route segments can be compared and analyzed for purposes of adjusting the energy usage prediction modelling procedure 140. These adjustments can be represented as model calibrations 322, which can be derived or otherwise obtained using a learning model 320.

As mentioned, the planning phase 100 and the driving phase 200 can develop energy usage prediction information 142 and actual energy usage information 242 based on off-board data 110 and onboard data 130, 210. Any of the off-board data 110 and onboard data 130, 210 used in the procedures 140, 240 can be taken at a specific time and associated with a timestamp (or other time indicator). This data can also correspond to a single point of time, a period of time, or a combination thereof.

The off-board data 110 can be any data that is obtained from another source besides the vehicle 12. The off-board data can be obtained from the vehicle backend services facility 80, computer 78, or another server or computing device that is accessible over the internet or other computer network. In the illustrated embodiment, the off-board data 110 includes map position data 112, map elevation data 114, route speed data 116, traffic data 118, and weather data 120. The data 112-118 can be geographical roadway map data that is stored in the databases 84 of the backend facility 80. The map position data 112 can include data representing geographical coordinates with associated roadway indicators. The map elevation data 114 can include data representing geographical coordinates with associated altitude or elevation data and, in some embodiments, can include data representing slope or change in elevation values that are associated with the geographical coordinates. The route speed data 116 can include data representing speed limits (or other speed or velocity related data), each of which can be associated with a geographical coordinate pair or a geographical route segment. The traffic data 118 can represent traffic conditions along one or more roadways, and can be represented by geographical coordinates or segments with associated traffic condition indicators or observed or predicted vehicle speeds. The weather data 120 can represent weather conditions along one or more roadways, and can be represented by geographical coordinates or segments with associated weather condition indicators or observed or predicted weather patterns or conditions. The weather data can represent temperatures, road conditions (e.g., snow accumulation, flooding), precipitation amounts, natural disasters, and other weather-related data.

The onboard data 130 is data that is obtained from one or more onboard vehicle sensors, such as sensors 40-44, 64-66, or data that is otherwise obtained at vehicle 12. The onboard data 130 can be data that is received from the vehicle 12 via the wireless carrier system 70 and/or the land network 76. The onboard data 130 can be retrieved from the vehicle 12 through sending an onboard data inquiry message to the vehicle from the backend facility 80. The vehicle 12 can send an onboard data response message in response to the onboard data inquiry message with the requested data, which can be predefined or indicated in the onboard data inquiry message. Or, in another embodiment, the vehicle 12 can send the onboard data in a vehicle onboard data message that accompanies a vehicle navigational request message; these messages can be separate or may be embodied in the same message. In the illustrated embodiment, the onboard data 130 includes temperature data 132, HVAC data 134, and battery data 136. The temperature data 132 can be data representing the temperature of component of the vehicle (e.g., the transmission or propulsion system of the vehicle 12), which can be sensed using the thermometer 42 or another thermometer that is a part of the vehicle electronics 20. The HVAC data 134 can include HVAC control data, the HVAC sensor data, HVAC operational data, or a combination thereof, as discussed above. In one embodiment, the HVAC data 134 can include a temperature of an interior cabin as measured by the thermometer 42 and a temperature setting as configured by a user or automatically set by the vehicle 12. The battery data 136 can include a current SoC value of the electric battery pack 62, one or more battery temperatures as determined by the battery temperature sensor 66, a current battery voltage, and/or various other conditions or information pertaining to the electric battery pack 62. In other embodiments, the battery data 136 can include data regarding another vehicle battery, such as a 12V battery that provides power to various components of the vehicle electronics 20.

The onboard data 210 is data that is obtained from one or more onboard vehicle sensors, such as sensors 40-44, 64-66, or data that is otherwise obtained at vehicle 12. In many embodiments, the onboard data 210 includes different types of data from that of the onboard data 130; however, in some embodiments, the onboard data 210 and the onboard data 130 can include the same type of data, or may include some of the same data and some different types of data. The onboard data 210 and the onboard data 130 can be received from the vehicle 12 as a part of the same message, or may be received via different messages. The onboard data 210 can be received from the vehicle 12 via the wireless carrier system 70 and/or the land network 76. In one scenario, an onboard data inquiry message and an onboard data response message can be used or, in another embodiment, the vehicle 12 can send the onboard data in a vehicle onboard data message that accompanies a vehicle navigational request message. In the illustrated embodiment, the onboard data 210 includes GNSS data 212, vehicle speed data 214, distance and time data 216, elevation data 218, traffic data 220, energy usage data 222, and battery data 224. Any of the data 212-224 can be associated with, or correspond to, a time at the start of an actual route segment, at the end of an actual route segment, a time between the start and the end of an actual route segment, or a combination thereof. For example, GNSS data 212 can be provided that corresponds to both the start and the end of an actual route segment.

The GNSS data 212 can be current GNSS data regarding the vehicle 12. For example, the vehicle 12 can use the GNSS receiver 22 to receive a plurality of GNSS signals from a plurality (or constellation) of GNSS satellites 68. The GNSS data 212 can be a plurality of geographical coordinate pairs; however, in other embodiments, the GNSS data 212 can be a single geographical pair. Moreover, in an alternative embodiment, other location data can be used in place of (or in addition to) the GNSS data 212. The elevation data 218 can be data representing an altitude of the actual route segment, such as an altitude at one or more points along the actual route segment or an average altitude along the route segment. Also, the elevation data 218 can include an average slope of the actual route segment. In some embodiments, the GNSS data 212 can encompass the elevation data, or may include other elevation data. The elevation data 218 can be obtained from the GNSS receiver 22 at least in some embodiments.

The vehicle speed data 214 is data representing a speed of the vehicle 12. In one embodiment, the vehicle speed data 214 can be associated with, or can correspond to, a time at the start and/or the end of an actual route segment. Alternatively, the vehicle speed data 214 can correspond to an average vehicle speed over the actual route segment. The distance and time data 216 includes distance data and time data. The distance data can include a driving distance from the segment start to the segment end of the actual route segment. Additionally or alternatively, the distance data can include a driving distance from the start of the route to the end of the actual route segment. Moreover, in some embodiments, the distance data can include an odometer reading, which can be expressed in kilometers or mileage. The time data can include an amount or length of time beginning at the segment start to the segment end of the actual route segment. Additionally or alternatively, the time data can include an amount or length of time beginning at the start of the route to the segment end of the actual route segment. Also, the time data can include a time of day at the segment end of the actual route segment or the absolute time (e.g., a Coordinated Universal Time (UTC) timestamp) at the segment end.

The traffic data 220 can be data regarding one or more other vehicles on the roadway adjacent to or otherwise nearby the vehicle 12. In one embodiment, the vehicle 12 can use one or more vision sensors (e.g., radars, lidars, cameras) to obtain data regarding nearby vehicles and/or traffic signals. This data can then be embodied in the traffic data 220 that is sent to the backend facility 80. Alternatively or additionally, the traffic data 220 can use the wireless communications module 30 to communicate with other nearby vehicles using, for example, vehicle-to-vehicle (V2V) communications, such as through use of IEEE 802.11p. The traffic data 220 can include other locations (e.g., GNSS coordinates) of the other nearby vehicles, their velocities, other operating conditions, or other information regarding their operation along the roadway.

The energy usage data 222 can include an amount of energy used or consumed along the actual route segment. This amount of energy used or consumed or "energy usage amount" can be determined by subtracting a state of charge (SoC) value as measured at the end of the actual route segment from a SoC value as measured at the start of the actual route segment. The energy usage data 22 can include the start SoC value (i.e., the SoC value as measured at the end of the route segment) and the end SoC value in addition to the energy usage amount. In one embodiment, the SoC values can be represented as kilowatt-hours (kWh). In other embodiments, the energy usage amount can be represented in other units, such as a percentage of the overall or maximum SoC when the battery pack 62 is fully charged. The battery data 224 can be the same as the battery data 136, which can include a current SoC value of the electric battery pack 62, one or more battery temperatures as determined by the battery temperature sensor 66, a current battery voltage, and/or various other conditions or information pertaining to the electric battery pack 62, for example. Table 1 below provides a number of data elements that may (or may not) be used in various embodiments of the methods disclosed herein.

TABLE 1

| Category | Data Element | Input Planned (P) | Input Actual (A) | Output Match (M) | Units |
|---|---|---|---|---|---|
| Indexers | Section number (collection of edges between two waypoints) | sec | | sec | number |
| | Edge number (collection of segments on same road) | rd | | rd | number |
| | Segment number (atomic road segment) | num | | num | number |
| SoC | Customer-usable SoC at segment end | soc | soc | soc | percent |
| | Battery SoC at segment end | | bsoc | | percent |
| | Bulk SoC at segment end | | ksoc | | percent |
| Energy | Energy consumption along segment | en | en | en | kWh |
| | Energy level at segment end | kwh | kwh | kwh | kWh |
| Distance | Driving distance from segment start to segment end | len | len | len | km |
| | Driving distance from route start to segment end | dist | dist | dist | km |
| | Lifetime odometer at segment end | odo | odo | odo | km |
| Time | Driving time from segment start to segment end | dur | dur | dur | seconds |
| | Driving time from route start to segment end | tim | tim | tim | seconds |
| | Time of day at segment end | tod | tod | tod | seconds |
| | Absolute (UTC) timestamp at segment end | utc | utc | utc | seconds |
| Position | End point latitude | lat | lat | lat | degrees (WGS84) |
| | End point longitude | lng | lng | lng | degrees (WGS84) |
| | End point displacement | | disp | disp | km |
| | Direction from segment start to end point | dir | dir | dir | degrees (0 is north) |
| | Turn cost (TBD) | trn | | | number |
| | GPS dilution of precision | | dop | | number |
| Elevation | End point altitude | alt | alt | alt | km |
| | Average slope | slp | slp | slp | degrees (0 is flat) |
| Speed | Posted speed limit | spl | | | km/h |
| | Historical driving speed | sph | | | km/h |
| | Live traffic speed (used for ETA calculations) | spd | spd | spd | km/h |
| Weather | Average temperature | temp | temp | temp | degrees (celsius) |
| | Average wind speed | wspd | | | km/h |
| | Average wind direction | wdir | | | degrees (0 = tail, % 360) |
| | Average UV index | uv | | | 0 . . . 11 |
| Energy States | ES1 - energy consumed for driving and accessories | | es1 | | kWh |
| | ES2 - energy consumed for cabin air conditioning (HVAC) | | es2 | | kWh |
| | ES3 - energy consume for battery thermal conditioning | | es3 | | kWh |
| | ES4 - unused or remaining energy in the battery | | es4 | | kWh |
| | ES5 - total energy consumed (sum of ES1, ES2, and ES3) | | es5 | | kWh |
| Match Quality | Match type (tentative, exact, fill, detour, skip-start, skip-end) | | | match | enum |
| | Match displacement (distance between the matched segments) | | | disp | km |

It should be emphasized that only some of the data in Table 1 may be used by the methods disclosed herein, or in some implementations, all of the data in the table may be used in one or more of the methods disclosed herein.

Figure 3:
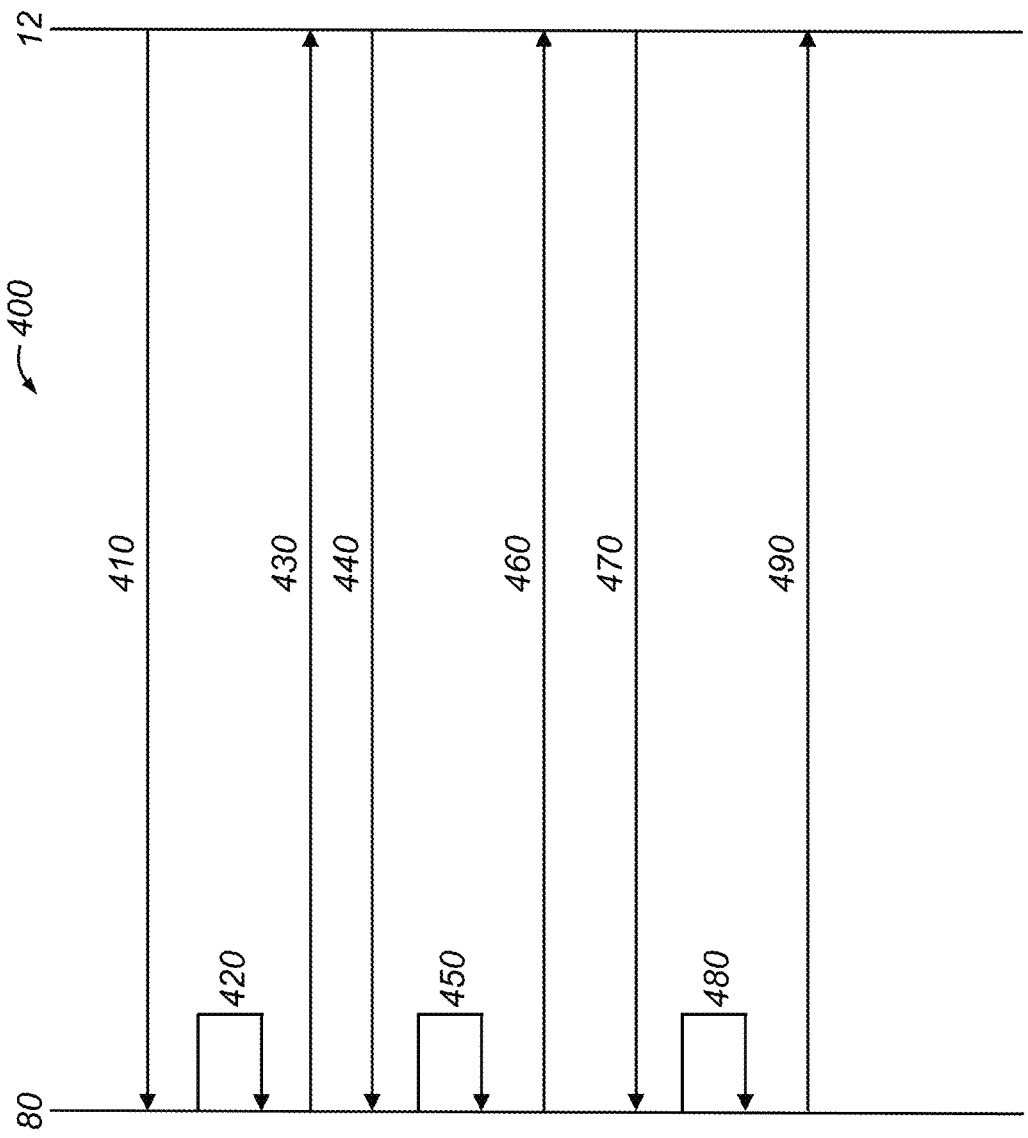
FIG. 3 is a communication diagram of an embodiment of a method of tracking energy usage in a vehicle.

With reference to FIG. 3, there is shown a method 400 of tracking energy usage in a vehicle. The method 400 illustrates communications between the vehicle 12 and the backend facility 80. In any of these steps in which information is communicated between the vehicle 12 and the backend facility 80, the information can be communicated using wireless carrier system 70, land network 76, and/or any other suitable communication path as discussed above or appreciated by those skilled in the art.

The method 400 begins with step 410, where the vehicle 12 sends route information to the backend facility 80. The route information can include a pair of geographical coordinates (e.g., GNSS coordinates) that indicate a route start location and a route end location. In other embodiments, the vehicle 12 can send other types of location information or other information that can be used to determine a route start location and a route end location. At the vehicle 12 and using the vehicle-user interfaces, a vehicle user can input route information into the vehicle 12, which can then use the wireless communications device 30 to send information to the vehicle 12 via, for example, wireless carrier system 70 and/or land network 76.

In addition to the route information, the vehicle 12 can send onboard data, such as onboard data 130, including the temperature data 132, HVAC data 134, and battery data 136. Alternatively or additionally, other onboard data 130 can be sent from the vehicle 12 to the backend facility 80. The onboard data 130 can accompany the route information in a single message, or may be sent in separate messages and/or at different times than the route information. The method 400 continues to step 420.

In step 420, the backend facility 80 develops or builds an energy usage prediction plan. In one embodiment, this step is carried out using the data 112-120 and 132-136 as obtained from an off-board system (e.g., databases 84) and the vehicle 12 (i.e., the onboard system). The energy usage prediction plan can be built using the method 600 discussed below, and can be based on the route information received from the vehicle 12. For example, the vehicle 12 can provide a route start location and a route end location to the backend facility 80, which can then determine a planned route for the vehicle 12 to travel along. In one embodiment, the planned route can be a route along which the vehicle is predicted as travelling along (i.e., a predicted route). In another embodiment, the planned route can be a route that is suggested as a route along which the vehicle should travel (i.e., a suggested route). Based on the planned route, the backend facility 80 can develop and/or build the energy usage prediction plan using an energy usage prediction model. The energy usage prediction model is a model or ruleset that includes or is based on a collection of energy usage information (e.g., previous or historical energy usage data received from a vehicle) that is associated with geographical data, such as geographical roadway map data. This can include dividing the route into a plurality of planned route segments and associating predicted energy usage information with each planned route segment. The method 400 continues to step 430.

In step 430, the planned route is sent to the vehicle 12 from the backend facility 80. In at least one embodiment, the planned route is sent to the vehicle 12 along with at least part of the energy usage prediction plan. The planned route can include one or more (and, usually, a plurality of) planned route segments. In one embodiment, all of the planned route segments of the planned route can be sent to the vehicle 12 along with predicted energy usage information associated with each of the planned route segments. In another embodiment, the planned route is sent to the vehicle 12 without the energy usage prediction plan (e.g., any predicted energy usage information). In other embodiments, a portion of the planned route can be sent to the vehicle (with or without associated predicted energy usage information), such as a beginning or starting portion. For example, the first twenty planned route segments starting from the starting planned route segment, which is the planned route segment that begins at the route start location or a location nearest the route start location). The method 400 continues to step 440.

In step 440, the vehicle sends onboard data to the backend facility. Prior to step 440, the vehicle 12 begins to travel along an actual route, which may correspond to the planned route. However, as will be discussed more below, in some scenarios, the vehicle 12 may travel along an actual route that is different than the planned route. Once the vehicle 12 begins to travel, onboard data is sent from the vehicle 12 to the onboard facility 80. In many embodiments, the onboard data 210 is sent from the vehicle 12 to the backend facility 80. This onboard data 210 can be collected or otherwise obtained by the vehicle 12 using vehicle system modules (VSMs) as discussed above. And, in one embodiment, as discussed above with respect to FIG. 2, the onboard data 210 includes GNSS data 212, vehicle speed data 214, distance and time data 216, elevation data 218, traffic data 220, energy usage data 222, and/or battery data 224. Other onboard data can be sent from the vehicle 12 to the backend facility 80.

In one embodiment, this onboard data can correspond to a single actual route segment. In such an embodiment, this onboard data can be sent to the backend facility 80 at the end of the actual route segment. The vehicle 12 can determine when the end of the actual route segment occurs, based on certain vehicle location information in conjunction with geographical roadway map data. In other embodiments, the vehicle 12 can send onboard data periodically to the backend facility 80, or upon the occurrence of certain events, such as the vehicle making a turn or travelling a certain distance. In this case, the backend facility 80 can process the onboard data to determine or separate the actual route into actual route segments. The method 400 continues to step 450.

In step 450, an actual route segment is matched to a planned route segment. As mentioned above, the vehicle 12 can send onboard information to the backend facility, which can then determine an actual route segment based on that onboard data. Or, in another embodiment, the vehicle 12 can determine the bounds of the actual route segment. In either embodiment, the actual route segment can be matched to a planned route segment based on geographical information. In many embodiments, the route tracking procedure 310 of the learning phase 300 (FIG. 2) can carry out this step at the backend facility 80. When a planned route segment is matched to an actual route segment, a matched route segment pair is obtained that includes the matched planned route segment and the actual route segment.

Additionally, once the actual route segment is matched to a planned route segment, matching information associated with this match can be sent to a learning model, such as the learning model 320 (FIG. 2), which can then send route matching feedback information back to the energy usage prediction modelling procedure 140 (FIG. 2). The energy usage prediction modelling procedure 140 can then update the planned route including the associated predicted energy usage information based on this route matching feedback information. This route matching feedback information can include GNSS data of the actual route (e.g., GNSS data 212), energy usage data 222, battery data 224, or other onboard data 220. Updating the planned route can include modifying attributes of planned route segments, removing planned route segments from the planned route, and/or adding planned route segments to the planned route. In at least one embodiment, the energy usage prediction modelling procedure 140 is carried out using the route end location (e.g., that was previously received at step 410) and the most recent vehicle location (e.g., the end location of the actual route segment) as a route start location to generate a planned route. In such an embodiment, this second iteration of the energy usage prediction modelling procedure 140 can use at least part of the onboard data received as a part of the feedback data, such as energy usage data 222 and GNSS data 212. In another embodiment, updating the planned route can include recalibrating the energy usage prediction plan based on actual energy usage that is derived or otherwise obtained from onboard data from the vehicle 12, such as energy usage data 222. The method then proceeds to step 460.

In step 460, the updated planned route information and/or predicted energy usage information is sent to the vehicle. In some embodiments, the updated planned route information is sent to the vehicle 12 and can include a new suggested route along which the vehicle should travel. In one scenario, the actual route segment may correspond to a planned route segment and, thus, the planned route can remain the same. In such a scenario, updated predicted energy usage information can be sent to the vehicle. And, even when actual route segment corresponds to a planned route segment, the actual route segment can vary slightly in terms of geographical location, such as the vehicle driving in a left lane where the planned route includes a path along a right lane. In such an instance, updated information can be sent to the vehicle 12 reflecting the slight deviation. The method 400 then continues to step 470.

Steps 470 through 490 correspond to steps 440 through 460 and constitute a second iteration of the actual route segment update procedure as discussed above. For example, step 470 corresponds to step 440 where onboard information is sent to the backend facility 80 from the vehicle 12. Step 480 corresponds to step 450 where an actual route segment is matched to a predicted route segment. And, step 490 corresponds to step 460 where updated planned route information and/or predicted energy usage information is sent to the vehicle. The method 400 can include zero or more iterations of this actual route segment update procedure. The method 400 can then end once the destination is reached by the vehicle or once the trip is otherwise terminated, such as by the vehicle user, the vehicle, or otherwise.

Figure 4:
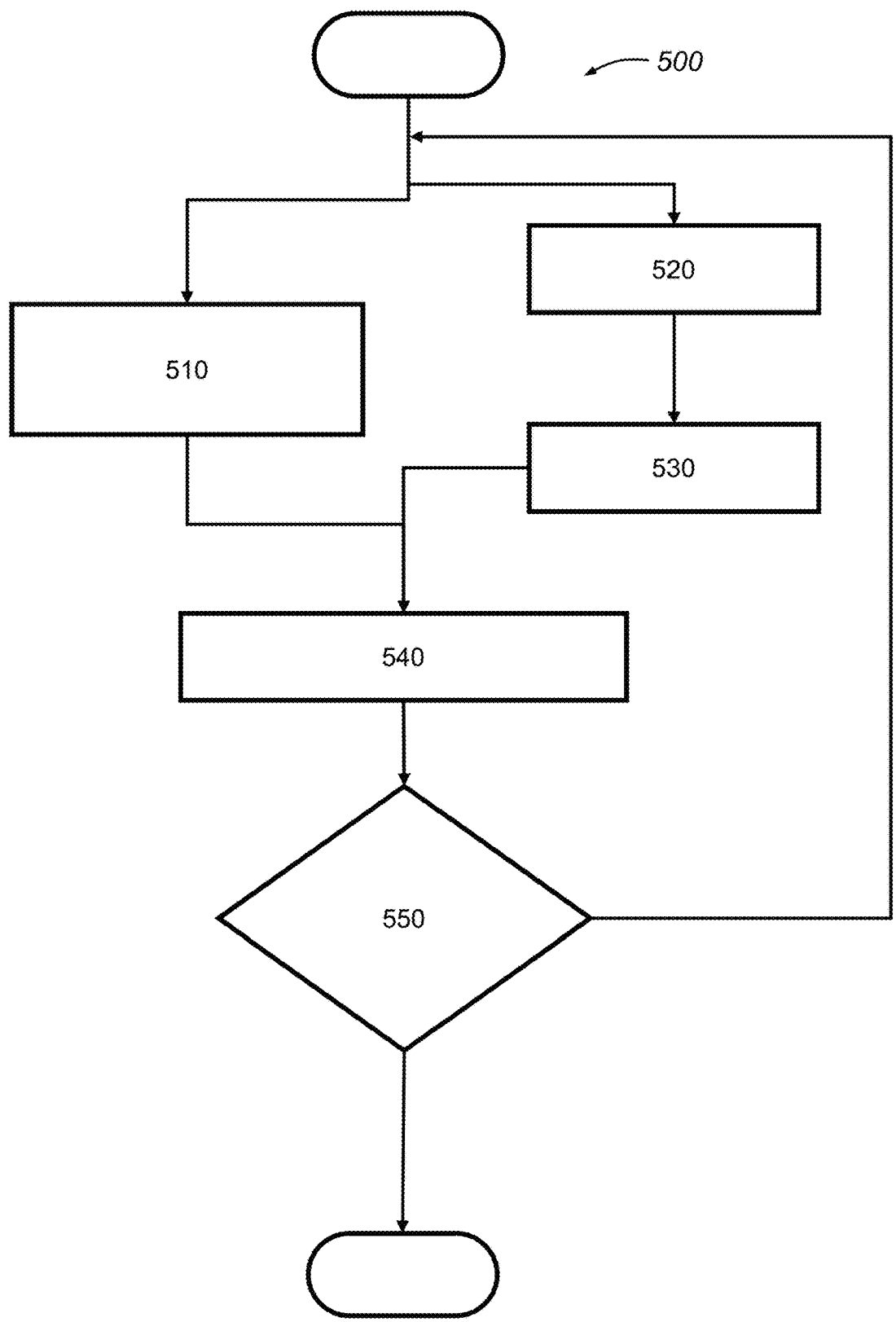
FIG. 4 is a flowchart of an embodiment of a method of tracking energy usage in a vehicle.

With reference to FIG. 4, there is shown a method 500 of tracking energy usage in a vehicle. The method 500 depicts an iteration of the process steps that can be carried out for each actual route segment that is received from the vehicle 12 and can correspond to the actual route segment update procedure discussed above (steps 440 to 460, and steps 470 to 490 of FIG. 3). In many embodiments, the method 500 is carried out at the backend facility by servers 82.

The method 500 begins with step 510, wherein planned route information is determined. As discussed above with respect to the method 400, route information is received from the vehicle 12. The route information can be used to determine an initial or first planned route along with predicted energy usage information. Moreover, as the vehicle 12 travels along an actual route, information from the vehicle 12 can be used to match an actual route to a planned route, as well as to obtain route matching feedback information. The route matching feedback information can then be used to update the planned route. The energy usage prediction plan and the planned route can be determined at a first instance of step 510, and then the energy usage prediction plan and/or the planned route can be updated upon consecutive instances of step 510. In many embodiments, step 510 can correspond to method 600 discussed below with respect to FIG. 5. Once the energy usage prediction plan and/or the planned route is determined or updated, the method 500 continues to step 540.

In step 520, onboard data is received from the vehicle. In many embodiments, this step corresponds to steps 440 and 470 of the method 400 discussed above (FIG. 3). The onboard data received from the vehicle 12 can be the onboard data 210. The method 500 then continues to step 530 where an actual route segment is determined. This step can include determining an actual route segment based on the onboard data received from the vehicle in step 520. In other embodiments, the vehicle 12 can determine the bounds (i.e., the geographical coordinates) of the actual route segment and then provide this information to the backend facility 80. The method 500 then continues to step 540. Steps 510 can occur at the same time as step 520 or step 530. Step 540 can begin once steps 510 through 530 have been carried out, although the particular order does not matter as any technically feasible order of those steps can be used.

In step 540, an actual route segment is matched to a planned route segment. This step corresponds to steps 450 and 480 of method 400 (FIG. 3). In one embodiment, the actual route that was determined in step 530 can be matched to one of the plurality of the planned route segments of the planned route based on the geographical coordinates of the actual route segment and the planned route segment. For example, the geographical coordinates of the actual route segment can be compared with geographical coordinates of the planned route segments and the planned route segment with the closest geographical coordinates can be "matched" to the actual route segment. This matching can be carried out using the route tracking procedure 310 of the learning phase 300 (FIG. 2). In many embodiments, the method 700 (FIG. 6) can be used to match the actual route to one of the planned route segments. The method 500 continues to step 550.

In step 550, it is determined whether the route end location (or destination) is reached. In on embodiment, this determination can be made by comparing the end location of the route segment to the route end location. As mentioned above, the route end location can be received from the vehicle as a part of the route information (step 410 of method 400 (FIG. 3)). Or, the route end location can correspond to an end location of a last planned route segment. This determination can be made by comparing geographical data (e.g., GNSS data 212) from the vehicle 12 with the geographical data of the route end location. Once it is determined that the vehicle is at the route end location (i.e., the route end location is reached), the method 500 ends.

When the destination is not reached, the method 500 continues back to steps 510 and 520. In step 510, the planned route and/or the predicted energy usage information can be updated. The planned route can be updated using geographical data that is provided to the energy usage prediction modelling procedure 140 as a part of the route matching feedback information. This geographical data can be geographical coordinates associated with the last actual route segment that was matched to a planned route segment at step 540. Also, vehicle energy usage data and/or battery data can be included in the route matching feedback information. In addition to updating the planned route, predicted energy usage information can be updated. In one embodiment, existing predicted energy usage information is modified based on the route matching feedback information. And, in another embodiment, the energy usage prediction modelling procedure 140 is carried out again using the end location of the last matched actual route segment as a route start location and using the same route end location. Moreover, instead of using onboard data that is received at the beginning of the trip (e.g., onboard data that is received in step 410 (FIG. 3)), onboard data obtained in a previous iteration of step 520 can be used. This onboard data can be temperature data 132, HVAC data 134, and battery data 136, but which corresponds to a time during or at the end of the last matched actual route segment. Once the planned route and/or the predicted energy usage information is updated, the method 500 then continues to step 540. Step 540 then can begin once again after steps 510 and 520 are carried out to obtain a next actual route segment. The method 500 continues in a like fashion until the stop condition (e.g., those of step 550) are reached.

Figure 5:
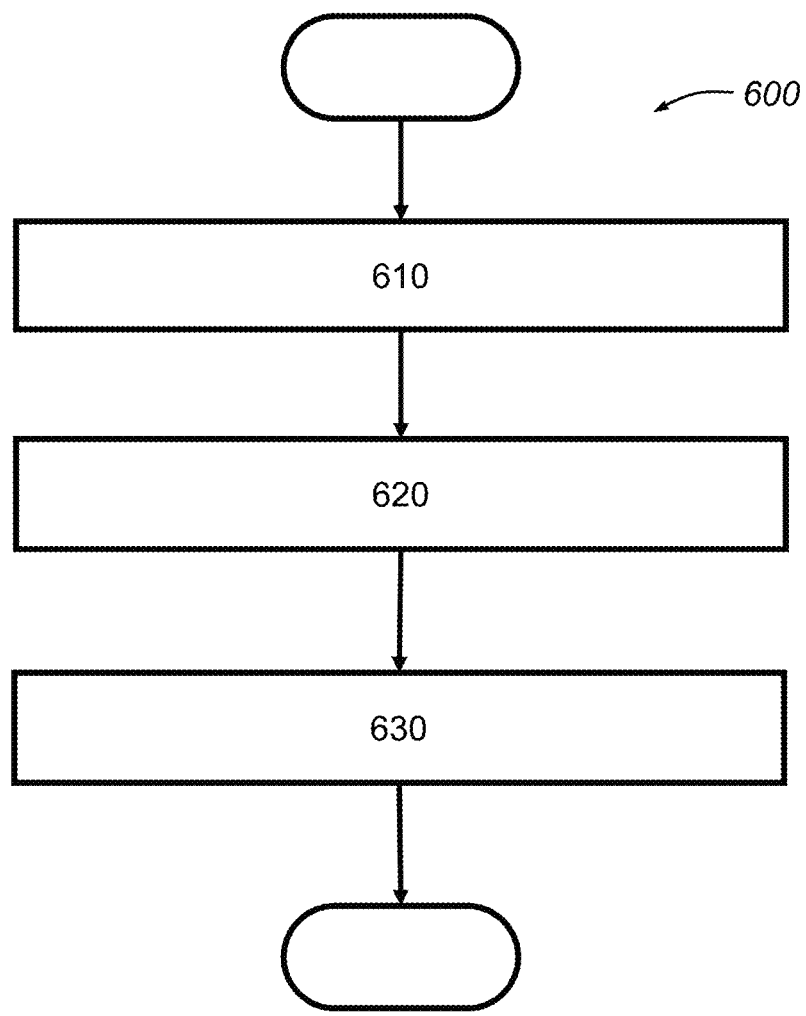
FIG. 5 is a flowchart of an embodiment of a method of generating an energy usage prediction plan.
Figure 6:
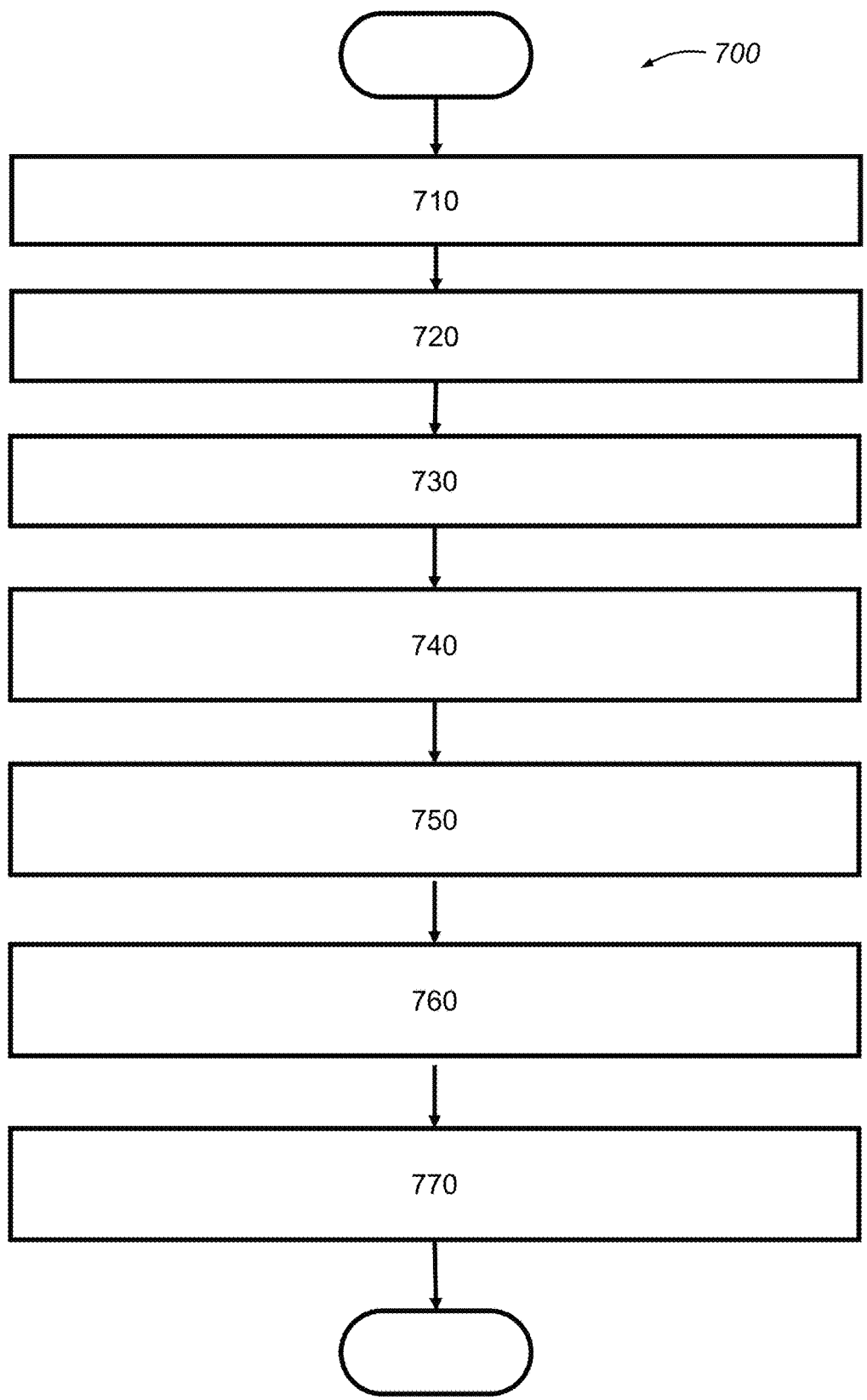
FIG. 6 is a flowchart of an embodiment of a method of performing a match analysis.

With reference to FIGS. 5 and 6, there is shown a method 600 and a method 700. The methods can be carried out by the backend facility 80 using one or more servers and, in at least some embodiments, can be carried out using a plurality of servers. In one embodiment, each of the methods are embodied in an application at the backend facility 80 or other remote computing device(s), such as computer 78. For example, the methods 600 and 700 can each be embodied in a separate application, or may be embodied in the same application. Moreover, the methods can be combined according to any technically feasible combination, as appreciated by those skilled in the art.

With particular reference to FIG. 5, there is shown a method 600 for generating an energy usage prediction plan. In one embodiment, the energy usage prediction modelling procedure 140 can use the off-board data 110 and the onboard data 130 to calculate or otherwise determine an energy usage prediction plan using the energy usage prediction modelling procedure 140.

The method 600 begins with step 610, wherein a plurality of planned route segments are determined. In one embodiment, the energy usage prediction modelling procedure 140 can determine a planned route from a departure location to a destination. The departure location can correspond or be the route start location that is received in step 410 (FIG. 3) and the destination can correspond to be the route end location that is received in step 410. Each of the planned route segments can include a route segment start location and a route segment end location. The planned route can then be broken or separated into one or more planned route segments that are serially attached to one another—that is, a route segment end location of a first planned rouge segment can be the same location as a route segment start location of the next planned route segment. The planned route segments can each be represented by two geographical coordinate pairs, or through use of other data that can geographically define the route segment (e.g., defining the route segment start location and the route segment end location). The length of each route segment can be determined based on certain roadway properties, such as based on the presence of turns, curves, traffic signals, intersections, or other roadway properties. Additionally or alternatively, the route segments can be based on a preset or predetermined length (e.g., 0.05 miles) or may be based on a combination of roadway properties and predetermined length or other properties. In one embodiment, each of the roadway segments are linear; however, in other embodiments, the roadway segments may be non-linear and/or may include one or more vertices. The method 600 continues to step 620.

In step 620, off-board and onboard data is obtained. In many embodiments, the off-board data can be geographical roadway map data, such as map position data 112, map elevation data 114, route speed data 116, and traffic data 118 (FIG. 2). Additionally, the off-board data can include weather data 120, or any other off-board data 110 as discussed above. In many embodiments, at least some of the off-board data can be based on one or more geographical locations of the planned route. For example, for each of the planned route segments, off-board data that is associated with a particular geographical location corresponding to that of the planned route segment can be obtained. In one embodiment, the off-board data can be obtained from databases 84 through querying the databases 84 based on the route segment start location and the route segment end location of each of the planned route segments. In one embodiment, the off-board data can include historical energy usage data or other historical data that pertains to the vehicle 12, to vehicles similar to the vehicle 12 (e.g., same propulsion system, same model), or to various other vehicles that traveled over the same route segments or route segments with similar properties.

Additionally, onboard data is obtained, such as the onboard data 130 discussed above. The onboard data 130 can be obtained in response to sending an onboard data inquiry message from the backend facility 80 to the vehicle 12; in this case, the vehicle 12 can respond with an onboard data response message that includes onboard sensor data and other onboard data, such as the data 132-136 discussed above. This data can correspond to data observed or determined at the vehicle 12 at the time of sending the destination (and/or other route information) to the backend facility 80. The method 600 continues to step 630.

In step 630, an energy usage prediction plan is generated based on the off-board and onboard data. In at least some embodiments, the energy usage prediction modelling procedure 140 can be used to estimate or predict energy usage information for each predicted route segment based on the obtained off-board and onboard data. The energy usage prediction modelling procedure 140 can begin with a first planned route segment that includes a point beginning at the departure location. The energy usage prediction modelling procedure 140 can use the obtained off-board and onboard data, such as data 110 and 130, to calculate or otherwise determine predicted energy usage information (e.g., a predicted energy usage value) for the first planned route segment. For example, the procedure 140 can calculate a predicted amount of energy that the electric battery pack 62 will use during vehicle travel along the first planned route segment (i.e., the "predicted energy usage value"). In addition to the data 112-120, 132-136 discussed above, the predicted energy usage value can be determined based on the vehicle's current speed, the vehicle's predicted speed at the planned route segment end location, the elevation or slope of the route segment at various points, the weather including wind speed and direction, the predicted driving time for the first route segment, a turn cost value (e.g., which can be based on a number of turns, the sharpness of the turns, a radius of the turns), traffic information, other roadway information (e.g., traffic signals and their associated average wait time), and current battery pack SoC. The current battery SoC value (as received from the vehicle 12, for example) can be used as a battery SoC start value. A battery SoC end value can then be derived from the battery SoC start value and the predicted energy usage value (or predicted change of battery SoC). This procedure can be repeated in an iterative process for the remaining planned route segments in the order of travel in which the vehicle 12 is predicted to travel along. When determining predicted energy usage values for the second planned route segment, the energy usage prediction modelling procedure 140 can use the battery SoC end value of the first route segment as the battery SoC start value for the second planned route segment. Once planned energy usage information (e.g., the predicted energy usage values) for all of the planned route segments of the planned route is obtained, the method 600 then ends.

As described in more detail below, the method 600 can be carried out numerous times for the same planned route. The method 600 can receive input from model calibration data 322 from the learning phase 300, which can be used by the method 600 to calculate updated predicted energy usage information for the remaining planned route segments. Moreover, as a part of these subsequent iterations of the method 600, new planned route segments can be added or other properties of existing planned route segments can be added based on the model calibration data 322 (and/or other data) that is received from the learning phase 300. This allows, for example, more accurate energy usage information to be presented to a user of the vehicle 12.

With reference to FIG. 6, there is shown a method 700 of performing a match analysis. The method 700 begins with step 710, where an actual route segment is obtained. The actual route segment can be obtained as discussed above with respect to, for example, step 530 of method 500 (FIG. 4). Once the actual route segment is obtained, the method 700 continues to step 720. In step 720, position information is extracted from the onboard vehicle data. The position information can be GNSS data 212 and/or distance and time data 216, each or any of which can be associated with the actual route segment. In one embodiment, GNSS data 212 including a plurality of geographical coordinate pairs along the actual route segment can be extracted. Also, additionally or alternatively, odometer readings along the actual route segment (e.g., at the route segment start location and/or the route segment end location) can be extracted. The method continues to step 730.

In step 730, an approximate vehicle location along the planned route is determined. The approximate vehicle location can be defined by a single geographical coordinate pair or may correspond to a planned route segment. In one embodiment, this step can include moving a cursor along the planned route starting from the beginning of the planned route until a traveled distance is reached. The traveled distance can be equal to a driving distance from the start of the route to the segment end of the actual route segment. This distance can be determined by subtracting an odometer reading at the start of the trip, which can be a part of onboard data 130, from an odometer reading at the end of the actual route segment (e.g., part of the distance and time data 216). Once this approximate vehicle location is determined, the method 700 continues to step 740.

In step 740, planned route segments with a planned segment search window are obtained or identified. In one embodiment, a search window can be predetermined or preset and can be defined by a number of planned route segments, or may be defined by a distance. Other metrics, such as time, can be used to define the planned segment search window. The planned segment search window size can vary based on a variety of factors, including the type of road, the average speed of the road, other geographical roadway map data, the route segment size (e.g., actual route segment size, average actual route segment size, planned actual route segment size), etc. Then, using the approximate vehicle location (as determined in step 730) as a center of the planned segment search window, planned route segments within the search window can be identified. For example, an initial planned route segment can be identified based on the approximate vehicle location, and this identification can be carried out as a part of step 730 or thereafter. A lower bound can be defined by the planned segment search window and based on the initial planned route segment; the lower bound corresponds to planned route segments before (i.e., earlier along the planned route) than the initial planned route segment. An upper bound can be defined in a like manner but for planned route segments after the initial planned route segment. Then, starting with the initial planned route segment, planned route segments before the planned route segment can be identified through moving backward until the search window lower bound. The same can be done moving forward from the initial planned route segment with respect to the search window upper bound. The identification of the planned route segments within the search window ends when the lower bound and the upper bound has been exceeded or reached. The method 700 then continues to step 750.

In step 750, a planned route segment from the identified planned route segments is selected based on geographical proximity to the actual route segment. In one embodiment, geographical data can be extracted from each of the identified planned route segments. This extracted geographical data is then compared to the geographical data of the actual route segment. The planned route segment that is the closest in geographical proximity to the actual route segment is selected or identified based on the results of these comparisons.

In other embodiments, a different matching process can be used to select a planned route segment to be matched to the actual route segment. For example, instead of carrying out steps 730 to 750, another process can include selecting the planned route segment from all of the planned route segments of the planned route based on the geographical proximity to the actual route segment. In some embodiments, including, for example, steps 730 to 750, a planned route segment can be matched to the actual route segment in accordance with the a continuity principle where, provided two matches $[P_i, A_k]$ and $[P_j, A_l]$, $i<j$ if and only if $k<l$. The term $[P_i, A_k]$ represents the first match of planned route segment $P_i$ and actual route segment $A_k$ where i is the index of the planned route segment $P_i$ (with i=0 being the index of the first planned route segment) and where k is the index of the actual route segment $A_k$ (with k=0 being the index of the first actual route segment). Likewise, the term $[P_j, A_l]$ represents the first match of planned route segment $P_j$ and actual route segment $A_l$ where l is the index of the planned route segment $P_j$ (with j=0 being the index of the first planned route segment) and where l is the index of the actual route segment $A_l$. The method 700 continues to step 760.

In step 760, the selected planned route segment is set as a tentative match. A tentative match is a match between an actual route segment and a planned route segment that is not confirmed, but is considered a match for the present time. The method 700 continues to step 770, wherein a previously set or marked tentative match is set to a confirmed match. A confirmed match is a match between an actual route segment and a planned route segment that is considered final. In many embodiments, the planned route segment of a confirmed match is not reconsidered at a later time for matching with another actual route segment.

Accordingly, in some implementations, the match analysis involves categorizing the match or assigning a match type between the planned route and the actual route. A tentative match, as described above, may be one type. An actual match may occur when the actual route is nearest the planned location. A detour match, which is detailed further below, may occur when an actual match exists (e.g., the same estimate for SoC between planned and actual occurs) but the actual route is further than a threshold from the planned route and is thus considered a detour. A fill match may be interpolated from two adjacent matches where no actual match exists. A skip-start match may be a skipped match due to the actual start point being detected after the planned start point. Finally, a skip-end match may be a skipped match due to the actual end point being detected before the planned end point. After typing a match, the matches may be weighted or otherwise analyzed based on their match type and used to adjust the energy prediction model. The match typing and match analysis may help provide more accurate energy usage predictions, by comparing original energy consumption or charging predictions to the updated predictions by considering large deviations due to unforeseen events, which then allows the system and method to notify the user of the vehicle 12 of the potential change in estimated energy usage. Accordingly, the user can take early recovery actions and reduce range anxiety.

In one embodiment, the method 400, the method 500, the method 600, the method 700, and/or parts thereof can be implemented in a computer program (or "application") embodied in a computer readable medium and including instructions usable by one or more processors of one or more computers of one or more systems. The computer program may include one or more software programs comprised of program instructions in source code, object code, executable code or other formats; one or more firmware programs; or hardware description language (HDL) files; and any program related data. The data may include data structures, look-up tables, or data in any other suitable format. The program instructions may include program modules, routines, programs, objects, components, and/or the like. The computer program can be executed on one computer or on multiple computers in communication with one another.

The program(s) can be embodied on computer readable media (e.g., memory at servers 82, memory 38 of the wireless communications device 30, memory of BCM 24, memory of an infotainment unit), which can be non-transitory and can include one or more storage devices, articles of manufacture, or the like. Exemplary computer readable media include computer system memory, e.g. RAM (random access memory), ROM (read only memory); semiconductor memory, e.g. EPROM (erasable, programmable ROM), EEPROM (electrically erasable, programmable ROM), flash memory; magnetic or optical disks or tapes; and/or the like. The computer readable medium may also include computer to computer connections, for example, when data is transferred or provided over a network or another communications connection (either wired, wireless, or a combination thereof). Any combination(s) of the above examples is also included within the scope of the computer-readable media. It is therefore to be understood that the method can be at least partially performed by any electronic articles and/or devices capable of carrying out instructions corresponding to one or more steps of the disclosed method.

Figure 7:
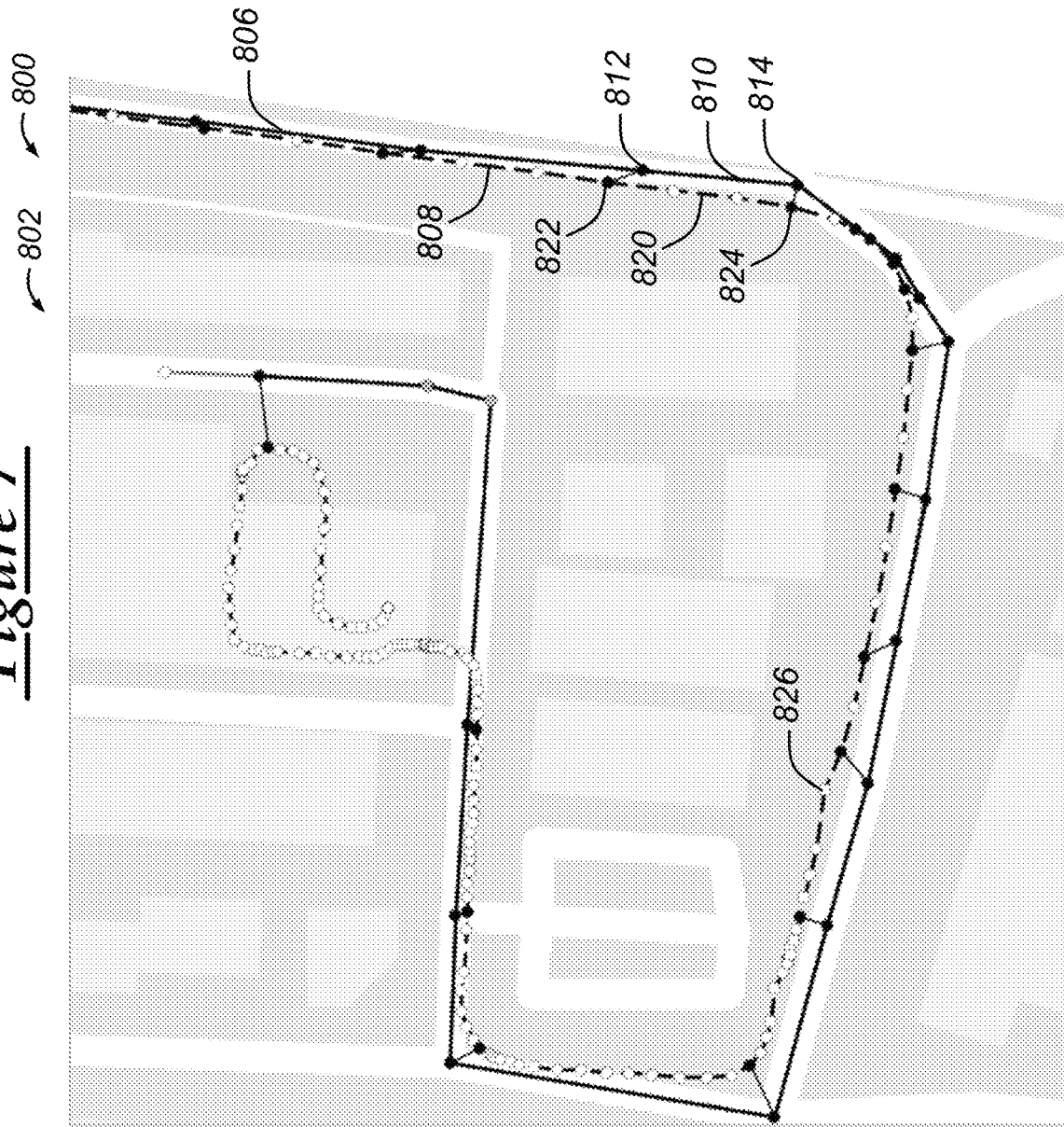
FIG. 7 depicts a map of a trip illustrating the matching of a planned route to an actual route.

With reference to FIG. 7, there is shown a trip 800 at a first portion 802 that includes a planned route 806 and an actual route 808. The planned route 806 is represented by the solid lines and the actual route 808 is represented by the dashed lines. The planned route 806 includes a plurality of planned route segments, one of which is identified at 810. The planned route segment 810 includes a planned route segment start location 812 and a planned route segment end location 814. The actual route 808 includes a plurality of actual route segments, one of which is identified at 820. The actual route segment 820 includes an actual route segment start location 822 and an actual route segment end location 824. The planned route segment 810 was matched to the actual route segment 820 as indicated by the connecting lines between the planned route segment start location 812 and the actual route segment start location 822, and the connecting lines between the planned route segment end location 814 and the actual route segment end location 824. Additionally, the actual route 808 includes a plurality of skipped points, one of which is identified as 826. The skipped point 826 was not matched to a route segment start location or a planned route segment end location and, thus, is marked as skipped. The onboard data that is received as a part of the skipped points can still be used in the match analysis or matching process to match other points of the actual route 808 to the planned route 806.

Figure 8:
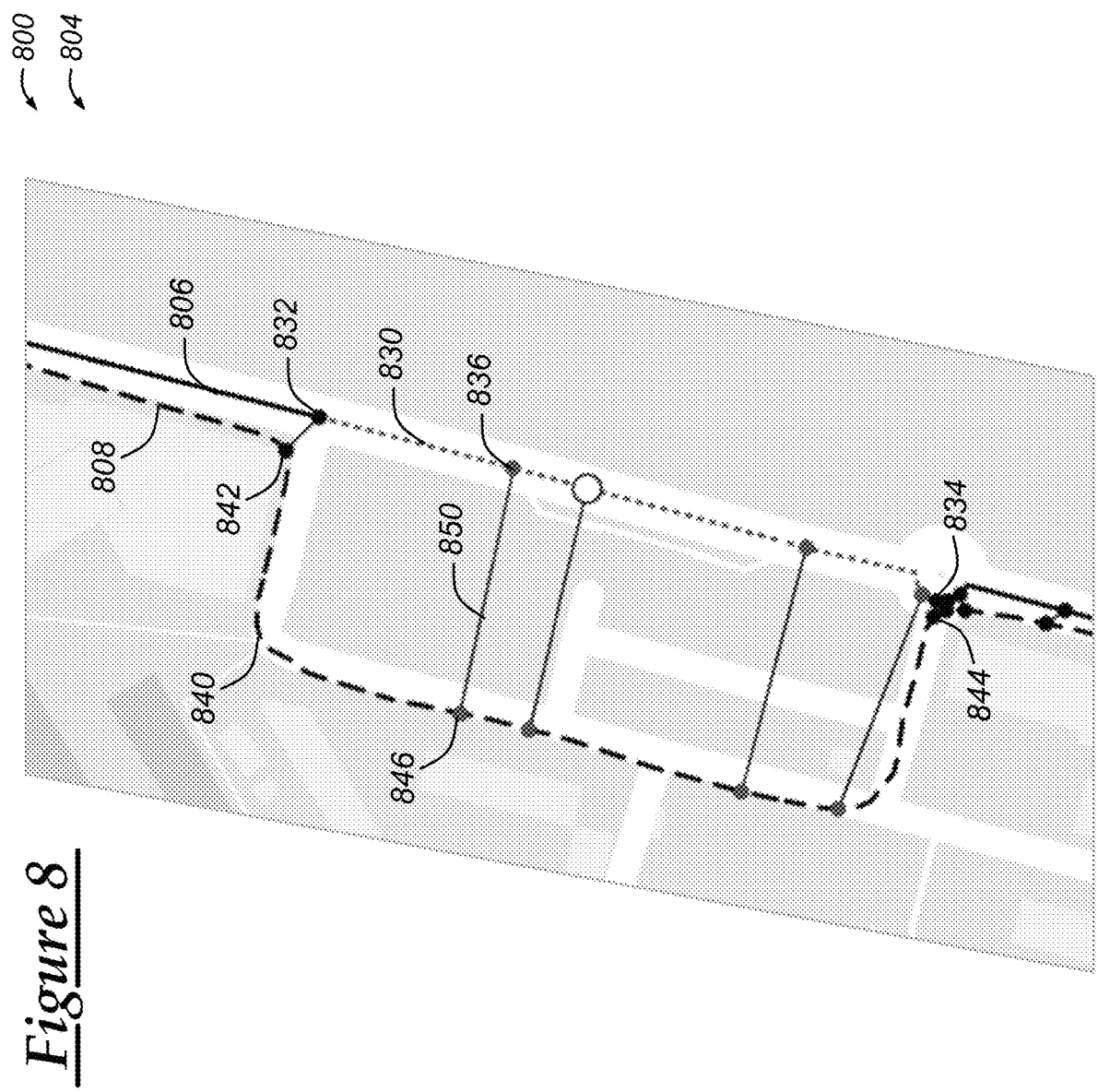
FIG. 8 depicts a map of a trip and the matching of a planned route to an actual route at a portion including a detour.

With reference to FIG. 8, there is shown the trip 800 at another portion 804 including the planned route 806 and the actual route 808. A planned route segment 830 is defined by a planned route segment start location 832 and a planned route segment end location 834. An actual route segment 820 is defined by an actual route segment start location 842 and an actual route segment end location 844. The planned route segment 830 is dotted to indicate that a detour match has been found for the planned route segment 830. A detour match is a confirmed match where the match displacement between the actual route segment and the planned route segment is greater than a detour displacement threshold value.

The match displacement is the distance between the matched segments. In one embodiment, the match displacement is the distance between any two points that create a connection that is orthogonal to the actual route segment and the planned route segment. For example, the point 846 of the actual route segment 840 and the point 836 of the planned route segment are connected by a connecting edge 850. At the point 846 and the point 836 the connecting edge 850 is orthogonal to the actual route segment 840 and the planned route segment 830, respectively. Moreover, in addition to, or alternatively, the points 846 and the 836 can be linked or associated with one another based on a percentage of the overall segment. For example, a point that is 33% of the distance between the planned route segment start location and the planned route segment end location can be associated with a point that is 33% of the distance between the actual route segment start location and the actual route segment end location. Or, distances can be used instead of percentages. For example, the detour distance displacement threshold may be 0.2-1 km or 0.25-0.5 km or 0.3 km, to cite a few possibilities. In another embodiment, a combination of these techniques can be used to match points so that the match displacement can be calculated.

The actual route segment point 846 is not an actual route segment start location or an actual route segment end location, but is between these two along the actual route segment 840. The same is true for the planned route segment point 836 with respect to the planned route segment 830. These points that can be considered inner-segment locations and can be set to a "fill" match type. A fill match type is when there is no match for the point or location, but a match was interpolated since the point falls within a matched segment. For example, the actual route segment 840 and the planned route segment 830 are matched with points 846 and 836 falling within the segments, respectively. At the time of confirming the match (e.g., setting the match from a tentative match type to a confirmed match type (e.g., a detour match type)), the inner-segment points can be interpolated as a part of the segments of the confirmed match. Accordingly, the method may still be able to use data despite the detour.

Figure 9:
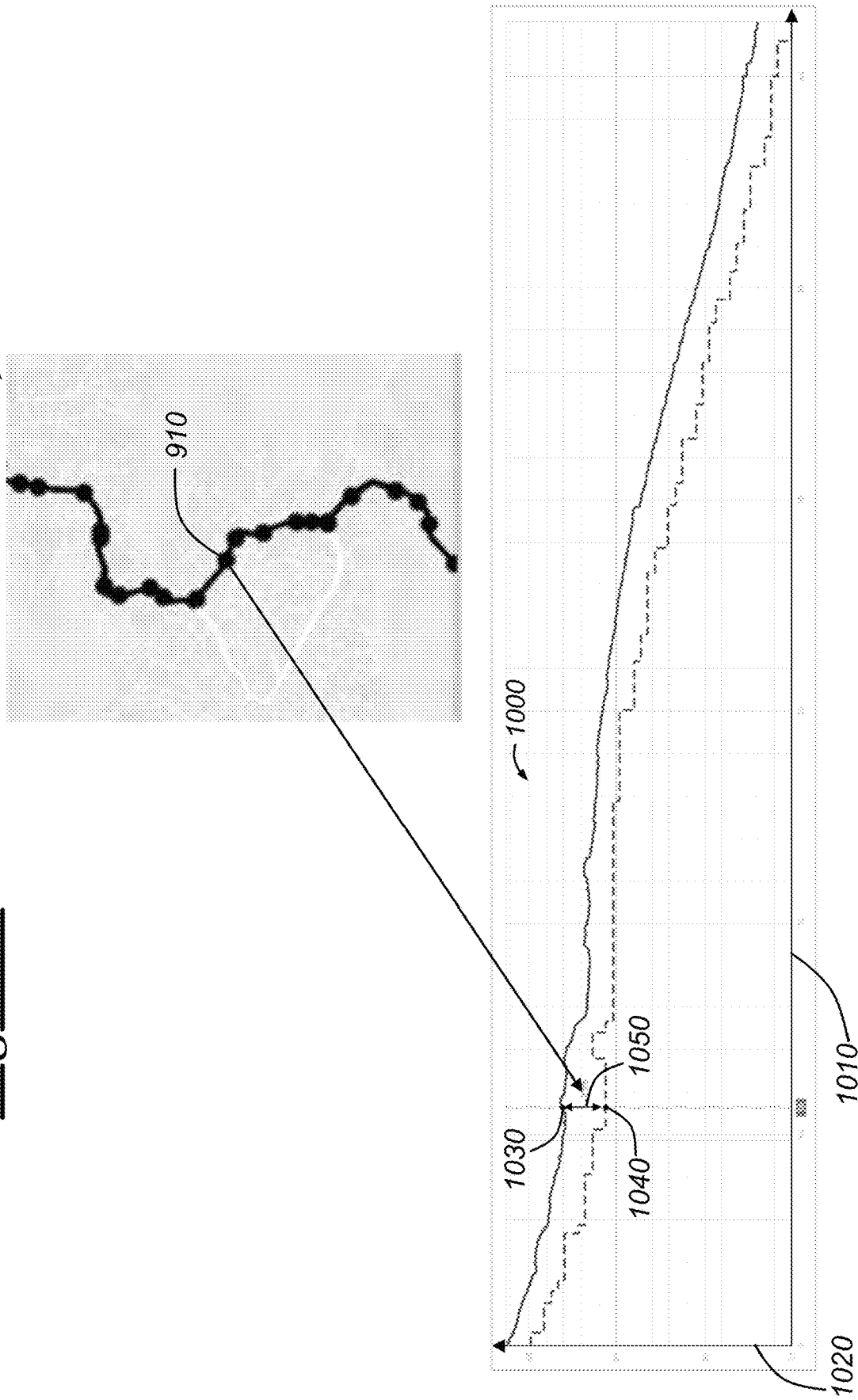
FIG. 9 depicts a map of a trip and a corresponding graph of energy usage information.

With reference to FIG. 9, there is shown a trip 900 with a matched point 910. The matched point 910 is a point pertaining to a matched location along the actual route and the planned route, and can correspond to a route segment start location, a route segment end location, or both. Also, FIG. 9 depicts a graph 1000 that illustrates the amount of energy usage 1020 (the y-axis) with respect to route distance 1010 (the x-axis). The solid line illustrates the predicted energy usage over route distance and the dashed line illustrates the actual energy usage over route distance. The graph 1000 depicts the model error 1050 at the matched point 910. The model error 1050 is the difference between the predicted energy usage value 1030 at the matched point 910 and the actual energy usage value 1040 at the matched point 910. The predicted energy usage value 1030 can be predicted using the energy usage prediction modelling procedure 140 (FIG. 2), as well as the methods discussed above. The actual energy usage value 1040 can be obtained from the vehicle 12 via readings or measurements from one or more onboard vehicle sensors.

Figure 10:
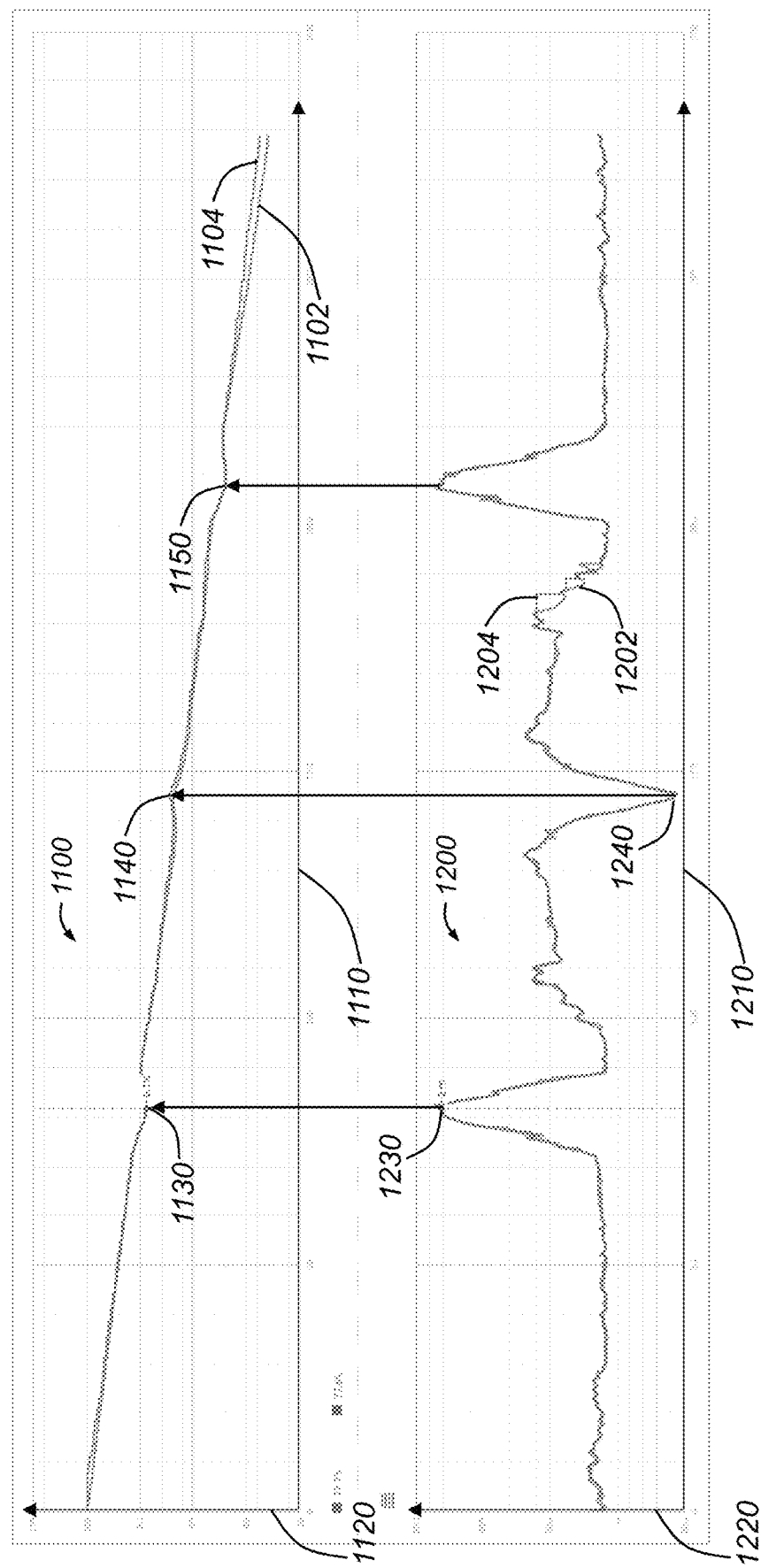
FIG. 10 depicts two graphs with a first graph depicting energy usage information and the second graph depicting corresponding elevation information.

With reference to FIG. 10, there is shown two graphs 1100 and 1200. The graph 1100 depicts energy usage 1120 versus route distance 1110. The energy usage 1120 can be a SoC value, such as a SoC percentage of the maximum possible SoC of the vehicle battery pack 62. The graph 1100 includes a predicted energy usage line 1102 and an actual energy usage line 1104. The graph 1200 depicts elevation of a planned route and of a corresponding actual route, with the y-axis 1220 being the elevation and the x-axis 1210 being the route distance. The graph 1200 includes a plurality of matched points 1230, 1240, 1250 that correspond to a plurality of matched points 1130, 1140, 1150 of the graph 1100.

A first matched point 1130 is depicted, which illustrates a 0.1% difference between the predicted energy usage value and the actual energy usage value. This point 1130 corresponds to the point 1230 of the graph 1200, which illustrates that the location of the matched point 1130 is at a peak (or at least a local maximum) when compared to the other points along the route. At the point 1230, there is an elevation difference of 2 meters between the elevation data associated with the actual route and the planned route. In one embodiment, this difference can be analyzed in conjunction with the energy usage difference of 0.1% to aid or inform future energy usage prediction modelling processes that include this geographical location as represented by the matched point 1130. Accordingly, the method can use differences in the planned and actual routes to more accurately estimate energy usage. This more accurate energy usage prediction can be presented to the user of the vehicle 12 (e.g., on display 50 or via an application program on mobile device 90) or used in other ways to more accurately track and/or estimate energy usage.

Figure 11:
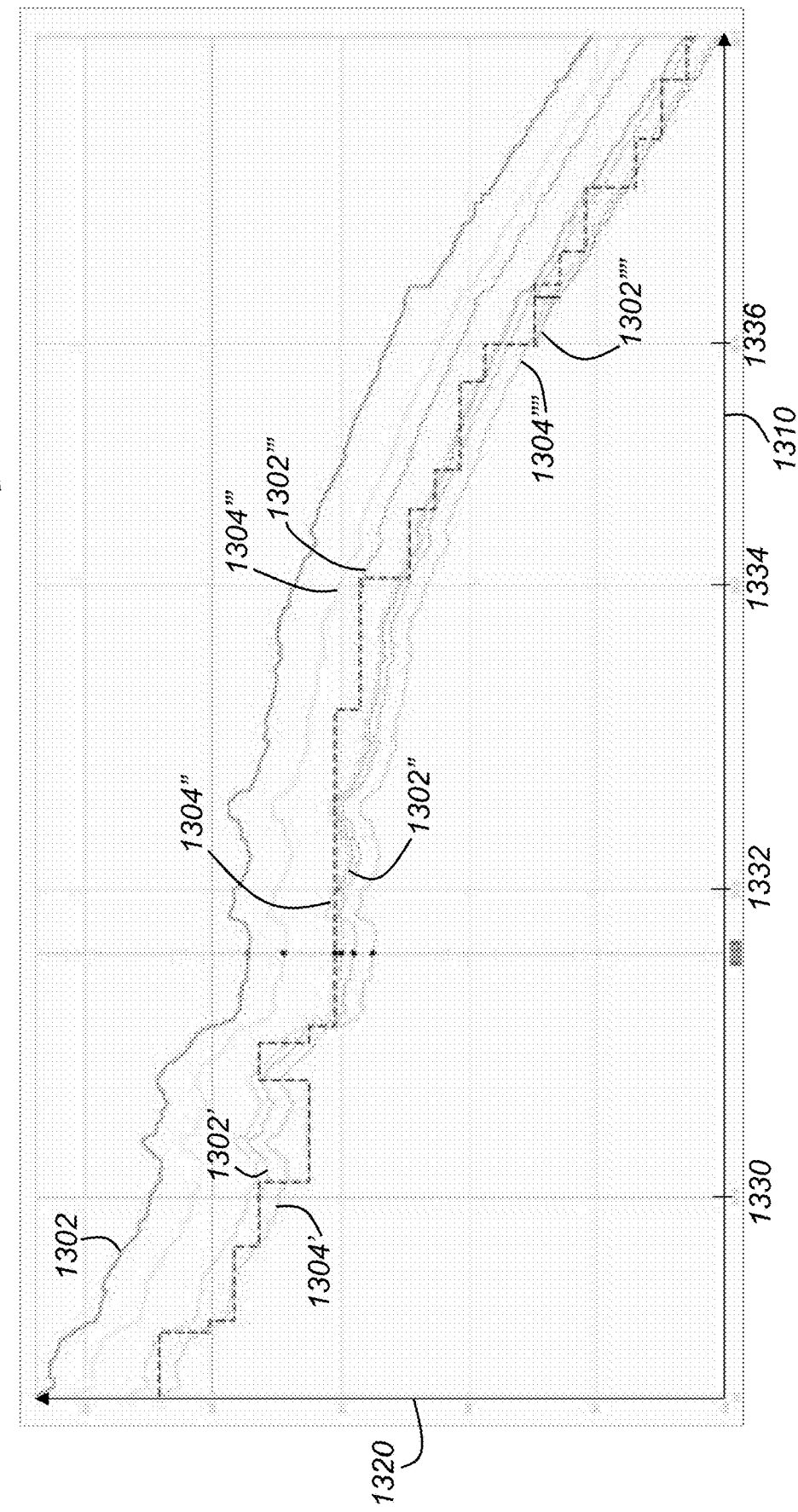
FIG. 11 is a graph depicting one embodiment of state of charge (SoC) learning convergence.

FIG. 11 is a graph 1300 that illustrates the iterative nature of the methods described herein. In the graph 1300, SoC learning convergence is illustrated. Distance (km) is represented on the x-axis 1310 and SoC percentage is represented on the y-axis 1320. The route segments are generally divided at points 1330, 1332, 1334, 1336. Line 1302 represents the initial energy usage prediction model at the start of the route. The method is then re-ran to determine a new energy usage prediction model 1302', 1302", 1302''', and 1302'''' based on actual SoC usage (among other factors) 1304', 1304", 1304''', and 1304'''' respectively. The actual SoC (and accordingly the predicted SoC) may vary due to a number of factors, such as estimates in road slope or grade, temperature, etc. Despite these variances, the difference between the actual SoC 1304 and the predicted SoC 1302 generally lessens over time, and the method is able to better estimate energy usage, which can provide more confidence to vehicle users regarding when and where they need to stop at a charging station. The graph 1300 also illustrates the continuous recalibration of the energy model based on the measured errors, and recomputation of the energy usage prediction model along the remainder of the route to create an ever-learning prediction model that becomes more and more accurate as the ride progresses. This learning or convergence also allows adaptation of the methods to new car models by analyzing the energy usage for planned vs. actual routes, and can be used to significantly reduce the development and validation time for new vehicles while providing higher quality and accuracy.

Figure 12:
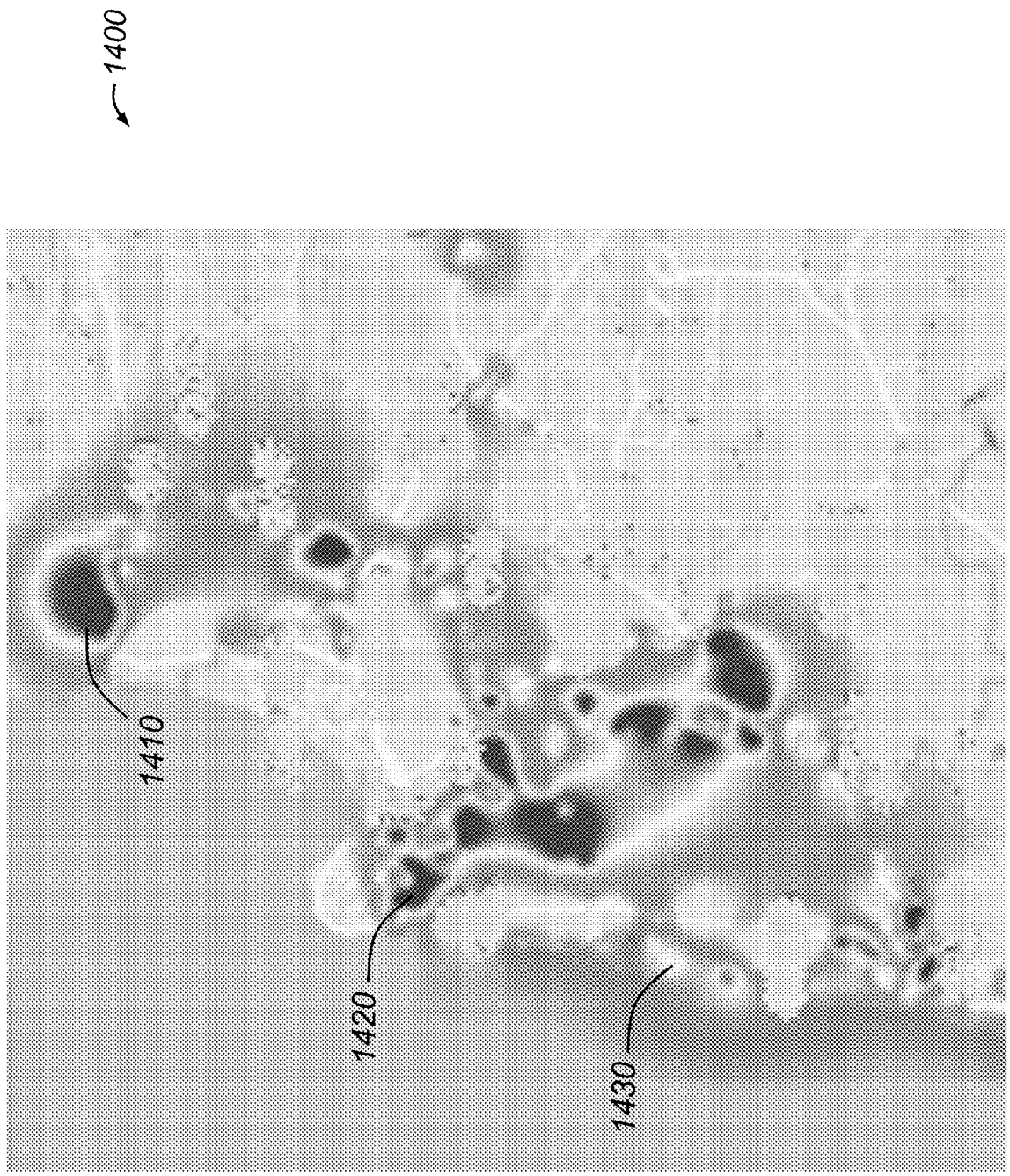
FIG. 12 is a heat map illustrating energy usage concentrations for a region.

With reference to FIG. 12, there is shown a heat map 1400 that depicts energy usage information from a plurality of vehicles and/or trips. The data is overlaid on the map and includes a gradient with the darker gradient portions (e.g., 1410, 1420) depicting higher levels of energy usage per meter and the lighter gradient portions (e.g., 1430) depicting lower levels of energy usage per meter. The portions that do not include a gradient overlaid thereon may include no data, small amounts of data, or very small amounts of energy usage per meter. The heat map 1400 is an example output that may be used by the user of vehicle 12 or another vehicle to more accurately predict energy usage along a route. More particularly, this energy usage data can be used by the energy usage prediction modelling procedure 140 (FIG. 2) or other method for predicted energy usage information for particular planned route segments. Moreover, as the backend facility 80 receives actual energy usage information from vehicles (e.g., vehicle 12), the backend facility 80 can update the energy usage information for those corresponding route segments in the databases 84. The crowd-sourced information from the heat map 1400 can allow for algorithm improvement and more continuous updating and learning.

It is to be understood that the foregoing is a description of one or more embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering any one or more of the following: "A"; "B"; "C"; "A and B"; "A and C"; "B and C"; and "A, B, and C."

What is claimed is:

1. A method of tracking energy usage in a vehicle, the method comprising:

building an energy usage prediction model specific to a vehicle make and/or a vehicle model of the vehicle;

obtaining a planned route for the vehicle, the planned route containing a plurality of planned route segments;

applying the energy usage prediction model to each of the planned route segments of the planned route to obtain a respective predicted energy usage for each of the planned route segments to collectively define an energy usage plan;

receiving onboard data from the vehicle;

constructing an actual route of the vehicle based on the onboard data, the actual route containing a plurality of actual route segments;

performing a match analysis between multiple of the planned route segments of the planned route and multiple of the actual route segments of the actual route, based on the onboard data, a real-time vehicle location, and a search window aligned with the real-time vehicle location and having a preset size with upper and lower bounds, to identify a deviation between the planned route and the actual route;

generating a revised planned route for the vehicle responsive to the deviation in the match analysis, the revised planned route including the planned route segments with modified route segment attributes, with at least one of the planned route segments removed, and/or with at least one new planned route segment added; and applying the energy usage prediction model to one or more of the planned route segments of the revised planned route to obtain predicted energy usage information for the one or more of the planned route segments of the revised planned route to collectively define a revised energy usage plan for the vehicle.

2. The method of claim 1, further comprising obtaining route information including a route start location and a route end location from the vehicle, wherein the route information is used to obtain the planned route for the vehicle.

3. The method of claim 1, wherein the energy usage plan includes a plurality of usage plan route segments, each of the usage plan route segments being associated with a respective one of the planned route segments and the predicted energy usage information of the respective planned route segment.

4. The method of claim 1, wherein the match analysis includes matching a planned route segment of the plurality of planned route segments of the planned route to an actual route segment of the plurality of actual route segments of the actual route based, at least partly, on a geographical proximity between the planned route and the actual route.

5. The method of claim 1, wherein defining the revised energy usage plan further comprises re-calibrating the energy usage plan based on route matching feedback information, the route matching feedback information including energy usage information obtained from the vehicle.

6. The method of claim 5, wherein the route matching feedback information includes at least some of the onboard data received from the vehicle, wherein the at least some of the onboard data is associated with a geographical point along the actual route segment that is matched to the planned route segment, and the at least some of the onboard data includes the energy usage information.

7. The method of claim 1, wherein the match analysis includes:
tentatively matching a first actual route segment of the actual route segments of the actual route to a first planned route segment of the planned route segments of the planned route to obtain a tentative match; and
confirming the tentative match to obtain a confirmed match upon tentatively matching a second actual route segment of the actual route segments to a second planned route segment of the planned route segments, the second actual route segment being further along the actual route than the first actual route segment, and the second planned route segment being further along the planned route than the first planned route segment.

8. The method of claim 7, wherein identifying the deviation includes:
determining if a match displacement between the first actual route segment and the second actual route segment is greater than a predetermined detour displacement threshold; and
identifying the tentative match as a detour match responsive to a determination that the match displacement between the first actual route segment and the second actual route segment is greater than the predetermined detour displacement threshold.

9. The method of claim 1, wherein the method is carried out by one or more servers located at a vehicle backend services facility, the one or more servers each including a processor, and wherein the one or more servers include computer instructions that, when executed, cause the processors to carry out the method steps.

10. A method of tracking energy usage in a vehicle, the method comprising:
receiving route information from the vehicle, the route information including a route start location and a route end location;
obtaining a planned route for the vehicle based on the route information, wherein the planned route includes a plurality of planned route segments;
generating a respective predicted energy usage for each of the plurality of planned route segments to collectively define an energy usage plan, the predicted energy usages of the planned route segments being based on onboard data received from the vehicle and off-board data obtained from a database;
receiving onboard data from the vehicle, the onboard data including energy usage data of the vehicle;
constructing an actual route of the vehicle based on the onboard data, wherein the actual route includes a plurality of actual route segments;
performing a match analysis by matching one or more of the actual route segments to one or more of the planned route segments to obtain a matched route segment pair, the matched route segment pair including a respective one of the actual route segments and a respective one of the planned route segments matched to the respective one of actual route segments, and wherein the matching is based, at least partly, on a real-time vehicle location, a search window aligned with the real-time vehicle location and having a preset size with upper and lower bounds, and a geographical proximity between the one or more actual route segments and the one or more planned route segments; and
updating the predicted energy usage information for a subset of the planned route segments, wherein the subset of planned route segments includes one or more of the plurality of planned route segments that are further along the planned route than the planned route segment of the matched route segment pair.

11. The method of claim 10, wherein the onboard data received from the vehicle includes: a state of charge (SoC) value of a battery pack of the vehicle;
and heating, ventilation, and air conditioning (HVAC) information of the vehicle.

12. The method of claim 10, wherein the updating step is based on at least part of the energy usage data received from the vehicle.

13. The method of claim 12, wherein the subset of planned route segments that are updated includes all of the plurality of planned route segments that are further along the planned route than the planned route segment of the matched route segment pair.

14. The method of claim 13, wherein the updating step includes generating predicted energy usage information for each planned route segment in the subset of planned route segments.

15. The method of claim 14, further comprising:
inputting the matched route segment pair along with corresponding energy usage information into a learning model, the corresponding energy usage information including at least some of the energy usage data received from the vehicle and the predicted energy usage information associated with the planned route segment of the matched route segment pair; and
generating model calibration information via the learning model based, at least in part, on the corresponding energy usage information.

16. A vehicle energy usage tracking system, comprising:
a server in communication with a vehicle, the server including a processor and a computer-readable memory, the computer-readable memory storing a computer program; and a database in communication with the server, the database storing off-board vehicle information;

wherein the computer program, when executed by the processor, causes the server to:
build an energy usage prediction model specific to a vehicle make and/or a vehicle model of the vehicle,
obtain a planned route for the vehicle, the planned route containing a plurality of planned route segments,
apply the energy usage prediction model to each of the planned route segments of the planned route to obtain a respective predicted energy usage for each of the planned route segments to collectively define an energy usage plan,
receive onboard data from the vehicle,
construct an actual route of the vehicle based on the onboard data, the actual route containing a plurality of actual route segments,
perform a match analysis between one or more of the planned route segments of the planned route and one or more of the actual route segments of the actual route, based on the onboard data, a real-time vehicle location, and a search window aligned with the real-time vehicle location and having a preset size with upper and lower bounds, to determine a deviation between the planned route and the actual route;
generate a revised planned route for the vehicle based on the match analysis, the revised planned route including the planned route segments with modified route segment attributes, with at least one of the planned route segments removed, and/or with at least one new planned route segment added; and
apply the energy usage prediction model to one or more of the planned route segments of the revised planned route to obtain predicted energy usage information for the one or more of the planned route segments of the revised planned route to collectively define a revised energy usage plan for the vehicle.

17. The vehicle energy usage tracking system of claim 16, wherein the match analysis includes:
tentatively matching a first actual route segment of the actual route segments of the actual route to a first planned route segment of the planned route segments of the planned route to obtain a tentative match; and
confirming the tentative match to obtain a confirmed match upon tentatively matching a second actual route segment of the actual route segments to a second planned route segment of the planned route segments, the second actual route segment being further along the actual route than the first actual route segment, and the second planned route segment being further along the planned route than the first planned route segment.

18. The vehicle energy usage tracking system of claim 16, wherein the match analysis includes matching a planned route segment of the plurality of planned route segments of the planned route to an actual route segment of the plurality of actual route segments of the actual route based, at least partly, on a geographical proximity between the planned route and the actual route.

19. The vehicle energy usage tracking system of claim 18, wherein the computer program, when executed by the processor, further causes the server to update the energy usage plan based on route matching feedback information, the route matching feedback information including energy usage information obtained from the vehicle.

20. The vehicle energy usage tracking system of claim 19, wherein the route matching feedback information includes at least some of the onboard data received from the vehicle, the at least some onboard data is associated with a geographical point along the actual route segment that is matched to the planned route segment, and the at least some onboard data includes the energy usage information.

\* \* \* \* \*